(12) United States Patent
La et al.

(10) Patent No.: US 11,749,844 B2
(45) Date of Patent: Sep. 5, 2023

(54) INSTANTANEOUSLY WETTABLE POLYMER FIBER SHEET

(71) Applicant: Amtek Research International LLC, Lebanon, OR (US)

(72) Inventors: Chi Thuong-Le La, Happy Valley, OR (US); Matthew Alan Warren, Salem, OR (US); James Emanuel, Corvallis, OR (US); Richard W. Pekala, Corvallis, OR (US)

(73) Assignee: Amtek Research International LLC, Lebanon, OR (US)

( * ) Notice: Subject to any disclaimer, the term of this patent is extended or adjusted under 35 U.S.C. 154(b) by 62 days.

(21) Appl. No.: 14/911,241

(22) PCT Filed: Aug. 11, 2014

(86) PCT No.: PCT/US2014/050583
§ 371 (c)(1),
(2) Date: Feb. 9, 2016

(87) PCT Pub. No.: WO2015/021480
PCT Pub. Date: Feb. 12, 2015

(65) Prior Publication Data
US 2016/0190656 A1    Jun. 30, 2016

Related U.S. Application Data

(60) Provisional application No. 61/864,317, filed on Aug. 9, 2013.

(51) Int. Cl.
*B29C 48/05* (2019.01)
*B29C 48/21* (2019.01)
(Continued)

(52) U.S. Cl.
CPC ......... *H01M 10/4235* (2013.01); *B29C 43/24* (2013.01); *B29C 48/0021* (2019.02);
(Continued)

(58) Field of Classification Search
CPC ............ B29C 47/0014; B29C 47/0064; D01D 5/088; D01D 5/08; D01D 5/003;
(Continued)

(56) References Cited

U.S. PATENT DOCUMENTS

| 3,351,495 A | 11/1967 | Wayne |
| 3,870,567 A | 3/1975 | Palmer et al. |

(Continued)

FOREIGN PATENT DOCUMENTS

| CN | 1476494 A | 2/2004 |
| JP | 2011524202 A | 9/2001 |

(Continued)

OTHER PUBLICATIONS 14835221.4, Extended European Search Report, dated Feb. 20, 2017, 10 pages.
(Continued)

*Primary Examiner* — Shawn Mckinnon
(74) *Attorney, Agent, or Firm* — Dorsey & Whitney LLP

(57) ABSTRACT

A polymer fiber sheet exhibits high porosity and good tensile properties in both "wet" and "dry" states. A fiber modifying agent is incorporated into a polymer extrusion and fiber formation process to produce a highly porous polymer fiber sheet that is instantaneously wettable by an aqueous medium. The fiber modifying agent functions as either one or both (1) a plasticizer that reduces the polymer extrudate melt viscosity and allows the formation of fine fibers during processing and (2) a surface modifying agent that promotes the instantaneous and sustainable wettability of individual polymer fibers and a porous fiber sheet formed from them.

(Continued)

SEM of a neat PBT fiber sheet.

The polymer fiber sheet maintains its wettability even after repeated washing and drying cycles. The resultant fiber sheet can be densified and embossed to provide a desired thickness and porosity, while at the same time longitudinal ribs with desired pattern can also be formed on the fiber sheet.

19 Claims, 14 Drawing Sheets

(51) Int. Cl.
| | |
|---|---|
| *H01M 10/42* | (2006.01) |
| *B29C 48/00* | (2019.01) |
| *H01M 10/06* | (2006.01) |
| *D04H 1/4291* | (2012.01) |
| *D04H 1/435* | (2012.01) |
| *D04H 1/56* | (2006.01) |
| *H01M 50/44* | (2021.01) |
| *H01M 50/449* | (2021.01) |
| *H01M 50/414* | (2021.01) |
| *H01M 50/406* | (2021.01) |
| *H01M 50/491* | (2021.01) |
| *H01M 50/451* | (2021.01) |
| *B29C 43/24* | (2006.01) |
| *C08J 5/18* | (2006.01) |
| *C08K 5/42* | (2006.01) |
| *D01D 5/00* | (2006.01) |
| *D01D 5/08* | (2006.01) |
| *D01D 5/088* | (2006.01) |
| *D01F 1/10* | (2006.01) |
| *D01F 6/16* | (2006.01) |
| *B29K 67/00* | (2006.01) |
| *B29L 7/00* | (2006.01) |
| *B29L 31/34* | (2006.01) |

(52) U.S. Cl.
CPC ............ *B29C 48/05* (2019.02); *C08J 5/18* (2013.01); *C08K 5/42* (2013.01); *D01D 5/003* (2013.01); *D01D 5/08* (2013.01); *D01D 5/088* (2013.01); *D01F 1/10* (2013.01); *D01F 6/16* (2013.01); *D04H 1/4291* (2013.01); *D04H 1/435* (2013.01); *D04H 1/56* (2013.01); *H01M 10/06* (2013.01); *H01M 50/406* (2021.01); *H01M 50/414* (2021.01); *H01M 50/44* (2021.01); *H01M 50/449* (2021.01); *H01M 50/451* (2021.01); *H01M 50/491* (2021.01); *B29K 2067/003* (2013.01); *B29K 2067/006* (2013.01); *B29L 2007/002* (2013.01); *B29L 2031/3468* (2013.01); *C08J 2367/02* (2013.01); *C08J 2471/02* (2013.01); *H01M 2220/20* (2013.01)

(58) Field of Classification Search
CPC ........ D04H 1/56; D04H 1/4291; D04H 1/435; D01F 6/16; D01F 1/10; H01M 2/162; B29K 2067/006; B29K 2067/003; C08K 5/42; C08J 2471/02

USPC .................................................. 442/400–401
See application file for complete search history.

(56) References Cited

U.S. PATENT DOCUMENTS

| | | | |
|---|---|---|---|
| 4,578,414 A | 3/1986 | Sawyer et al. | |
| 5,183,695 A * | 2/1993 | Masuhra | B32B 5/18 428/151 |
| 5,336,573 A | 8/1994 | Zuckerbrod et al. | |
| 5,965,648 A | 10/1999 | Brink et al. | |
| 6,120,939 A * | 9/2000 | Whear | D04H 1/4291 429/143 |
| 2002/0001753 A1 | 1/2002 | Pekala et al. | |
| 2002/0146380 A1 * | 10/2002 | Nambu | A61K 8/46 424/70.16 |
| 2002/0166592 A1 | 11/2002 | Liu et al. | |
| 2003/0193110 A1 | 10/2003 | Yaritz et al. | |
| 2004/0010909 A1 | 1/2004 | Emanuel et al. | |
| 2007/0232180 A1 * | 10/2007 | Polat | A61F 13/511 442/414 |
| 2009/0326827 A1 | 12/2009 | Mostowfi et al. | |
| 2010/0230613 A1 | 9/2010 | Pieprzyk et al. | |
| 2011/0151738 A1 * | 6/2011 | Moore | D04H 1/4291 442/334 |
| 2011/0219983 A1 | 9/2011 | Baseeth et al. | |
| 2011/0253222 A1 | 10/2011 | Arai | |
| 2011/0287203 A1 | 11/2011 | Victor et al. | |
| 2012/0070714 A1 * | 3/2012 | Chambers | C08L 89/00 429/145 |
| 2012/0145468 A1 | 6/2012 | Pekala et al. | |

FOREIGN PATENT DOCUMENTS

| | | |
|---|---|---|
| JP | 2003036832 A | 2/2003 |
| JP | 2004523088 | 7/2004 |
| JP | 2004523088 A | 7/2004 |
| JP | 200336832 | 2/2015 |
| WO | 9936978 A1 | 7/1999 |
| WO | 2009152345 A1 | 4/2002 |
| WO | 200242530 A1 | 5/2002 |
| WO | 2013070283 A1 | 5/2013 |
| WO | 2014151991 A1 | 9/2014 |
| WO | 2015021480 A1 | 2/2015 |

OTHER PUBLICATIONS

PCT/US2014/050583, International Preliminary Report on Patentability, dated Feb. 9, 2016, 9 pages.
PCT/US2014/050583, International Search Report and Written Opinion, dated Jan. 16, 2015, 12 pages.
Yoko, et al., "Determination of Additives in Food Contact Polypropylene", Journal of the Food Hygienics Society of Japan, 41(2), 2000, pp. 154-161.
International Search Report and Written Opinion dated May 28, 2015 for PCT/US2014/050538.
Examination Report dated Sep. 12, 2022 issued in European patent application No. 14835221.4 (5 pages).

\* cited by examiner

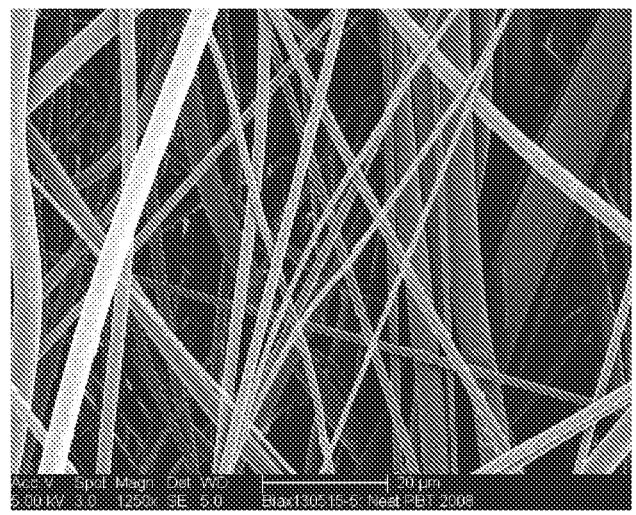
Fig. 1. SEM of a neat PBT fiber sheet.
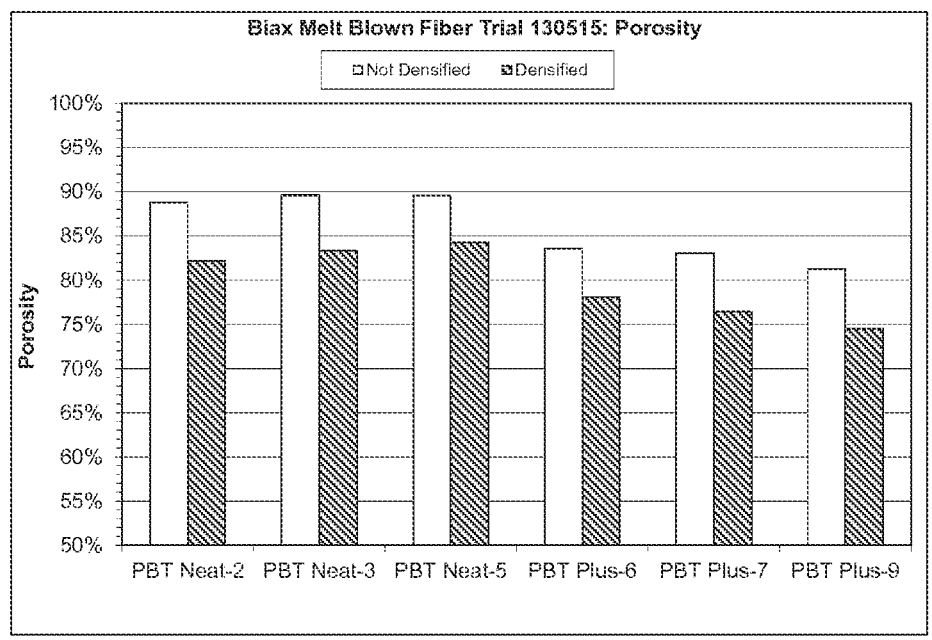
Fig. 2. Porosity of PBT fiber sheets before and after densification. The samples designated with "Plus" contain a surface modifying agent.

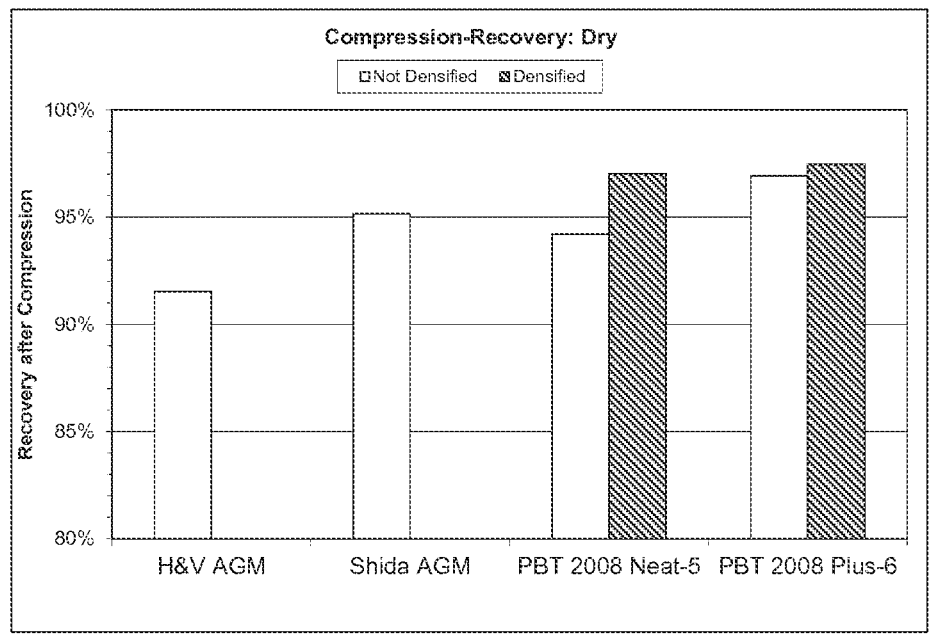
Fig. 3. Recovery after compression results for PBT fiber sheets as compared to those of AGM. The sample designated with "Plus" contains a surface modifying agent.
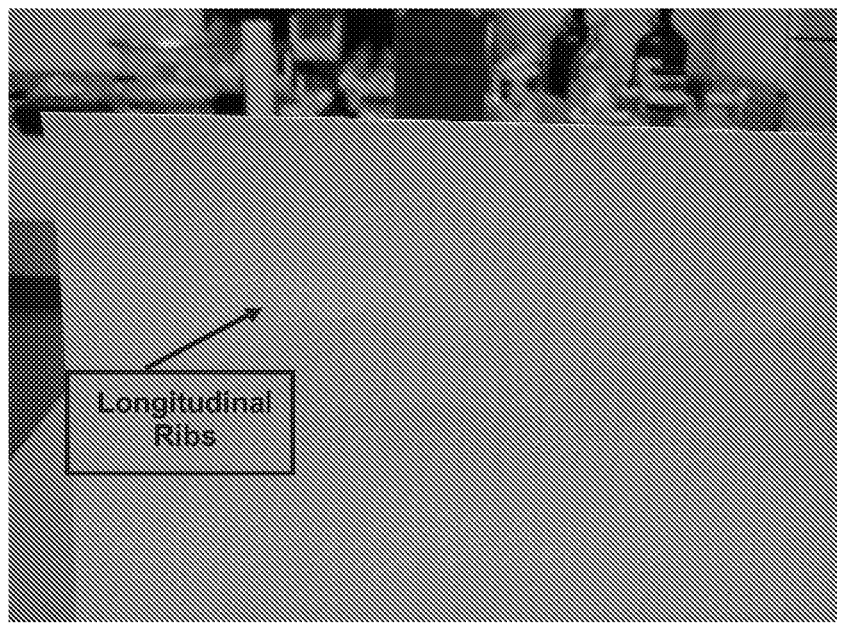
Fig. 4. A calendered PBT fiber sheet sample with longitudinal ribs.

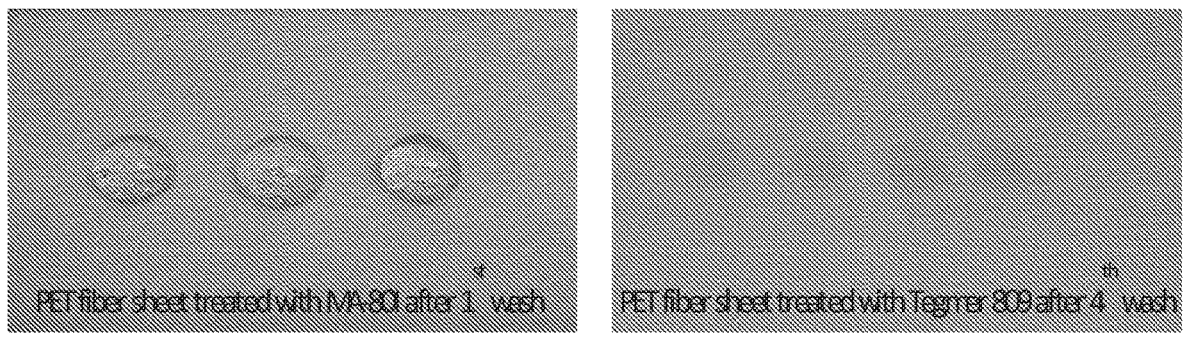

Fig. 5. Wetting behavior of PET polymer fiber sheets coated with MA-80I surfactant, after a first wash in water (left), and coated with a TegMeR® 809 surface modifying agent, after a fourth wash in water (right).

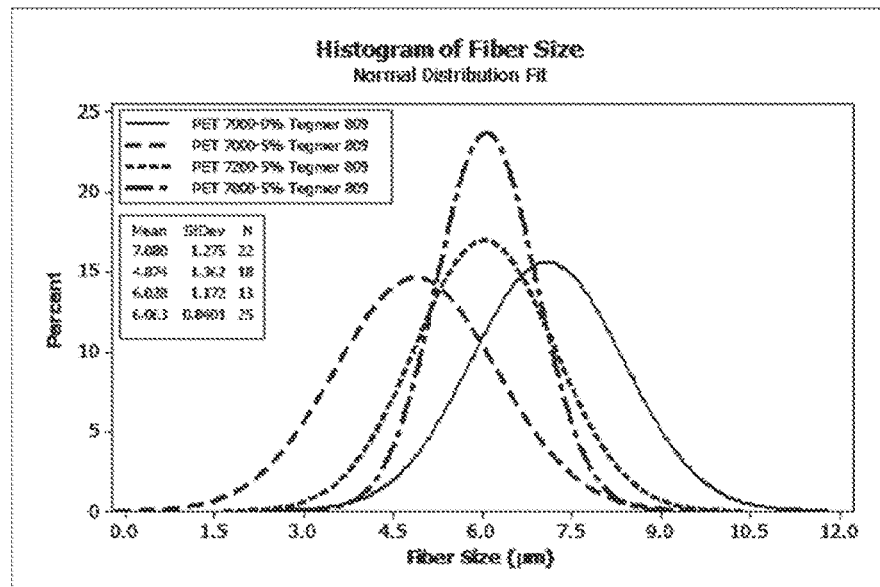

Fig. 6. Fittings (based on normal distribution) of the fiber size distributions of polymer fiber sheets prepared with PET resins having different intrinsic viscosity values, utilizing a TegMeR® 809 fiber modifying agent.

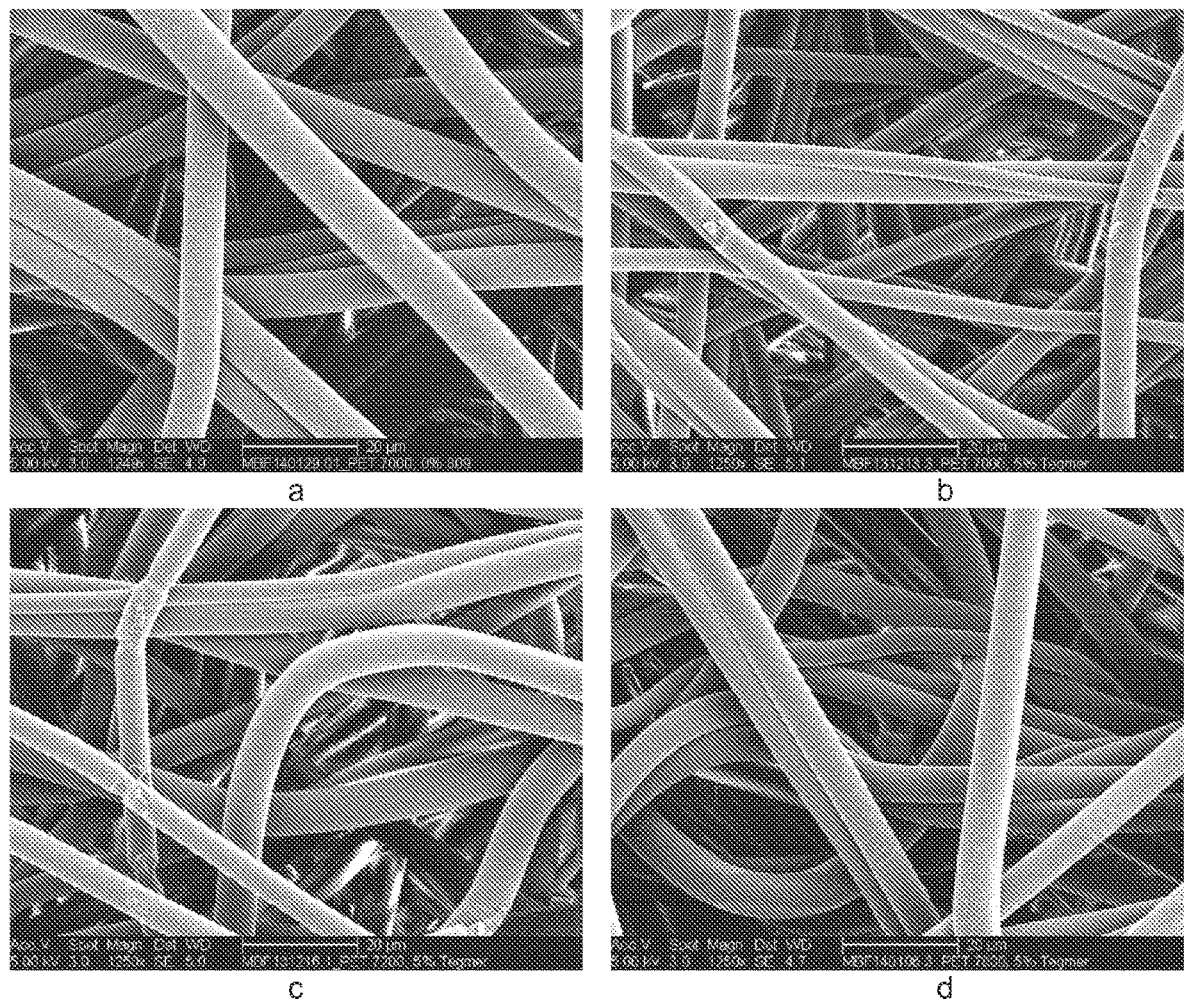
Fig. 7. Scanning electron micrographs of the melt blown polymer fiber sheets prepared from (a) neat PET 7000, (b) PET 7000 with 5 wt.% TegMeR® 809, (c) PET 7200 with 5 wt.% TegMeR® 809, and (d) PET 7800 with 5 wt.% TegMeR® 809.

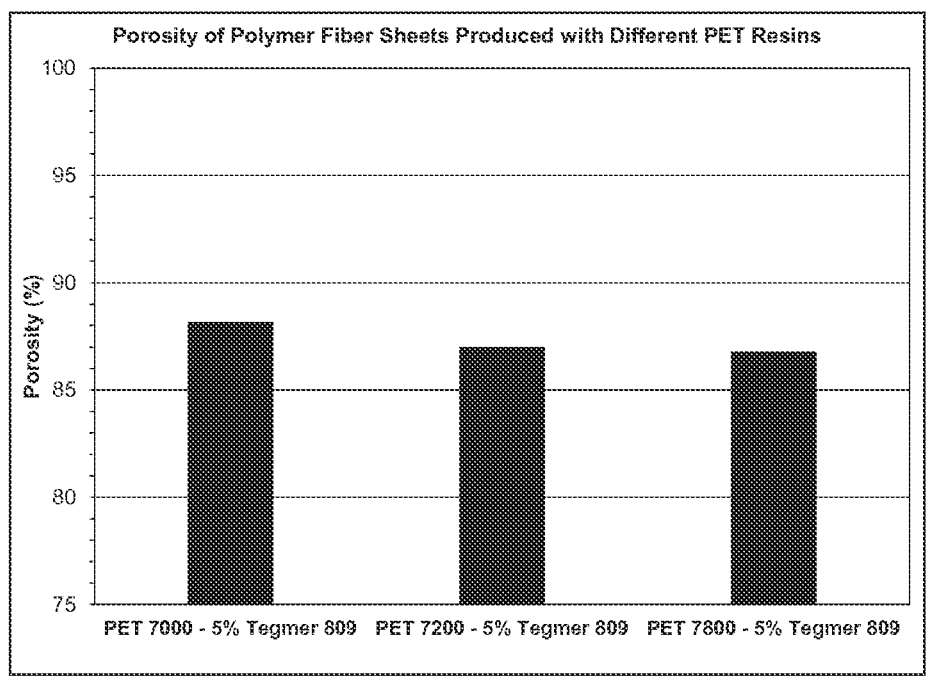
Fig. 8. Porosity of fiber sheets prepared from different PET resins.
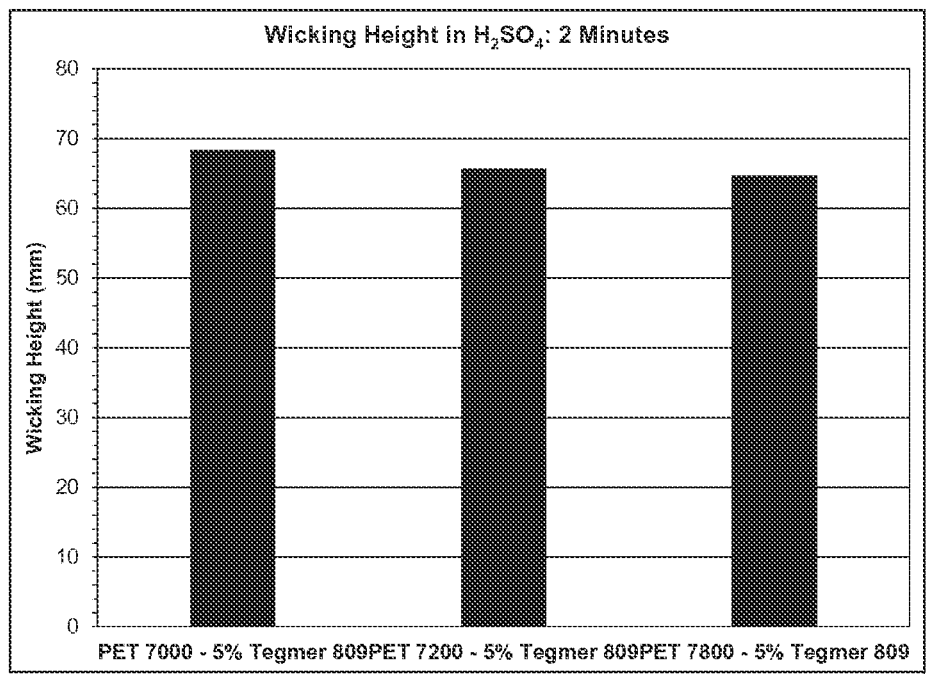
Fig. 9. Two-minute wicking performance of melt blown polymer fiber sheets prepared from different PET resins.

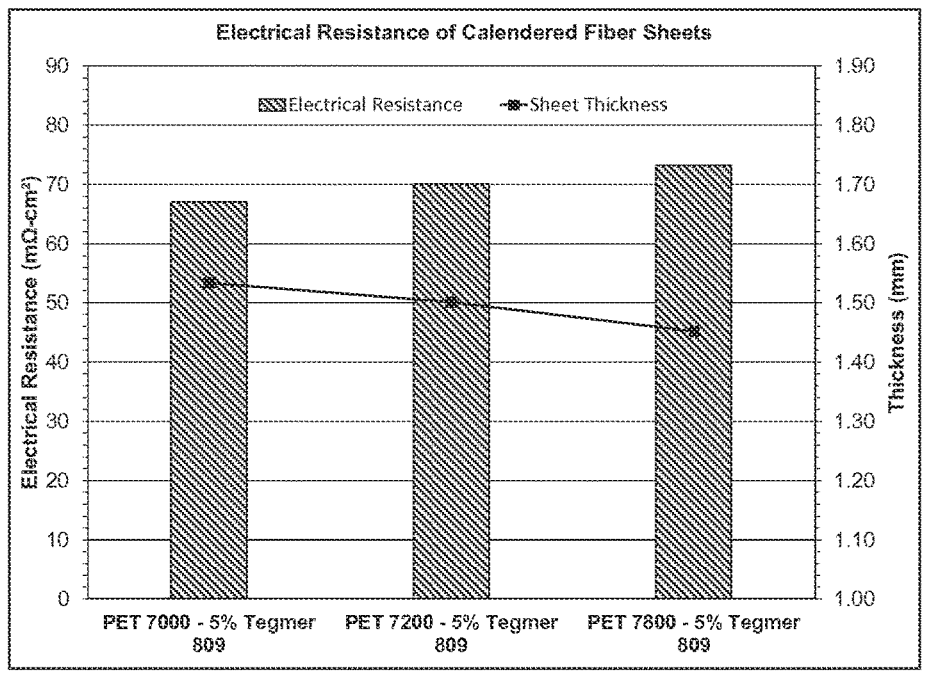
Fig. 10. Electrical resistance of melt blown polymer fiber sheets prepared from different PET resins.
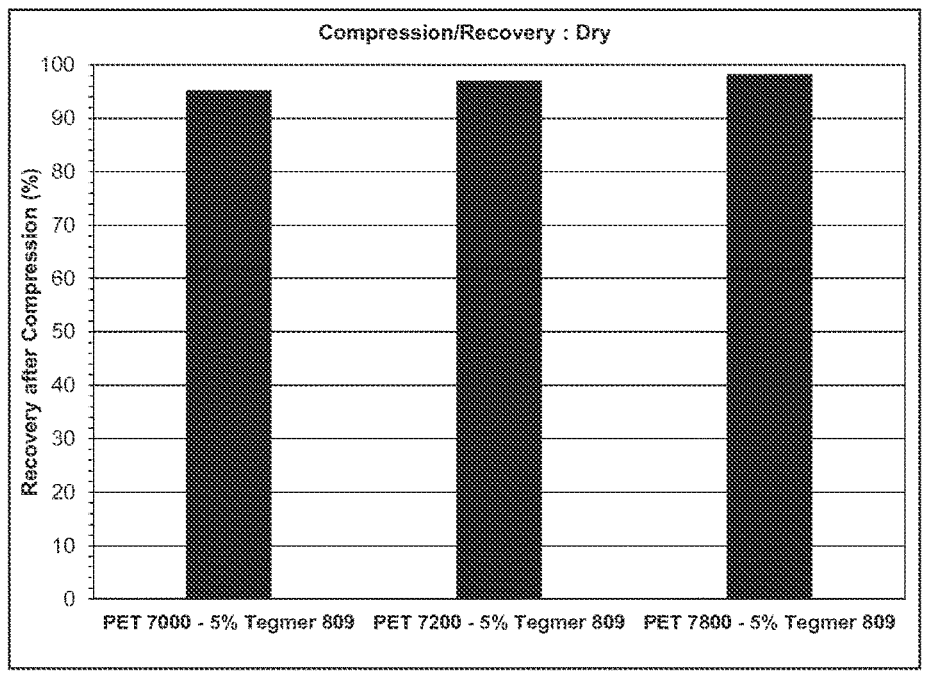
Fig. 11. Compression recovery results of melt blown polymer fiber sheets prepared from different PET resins.

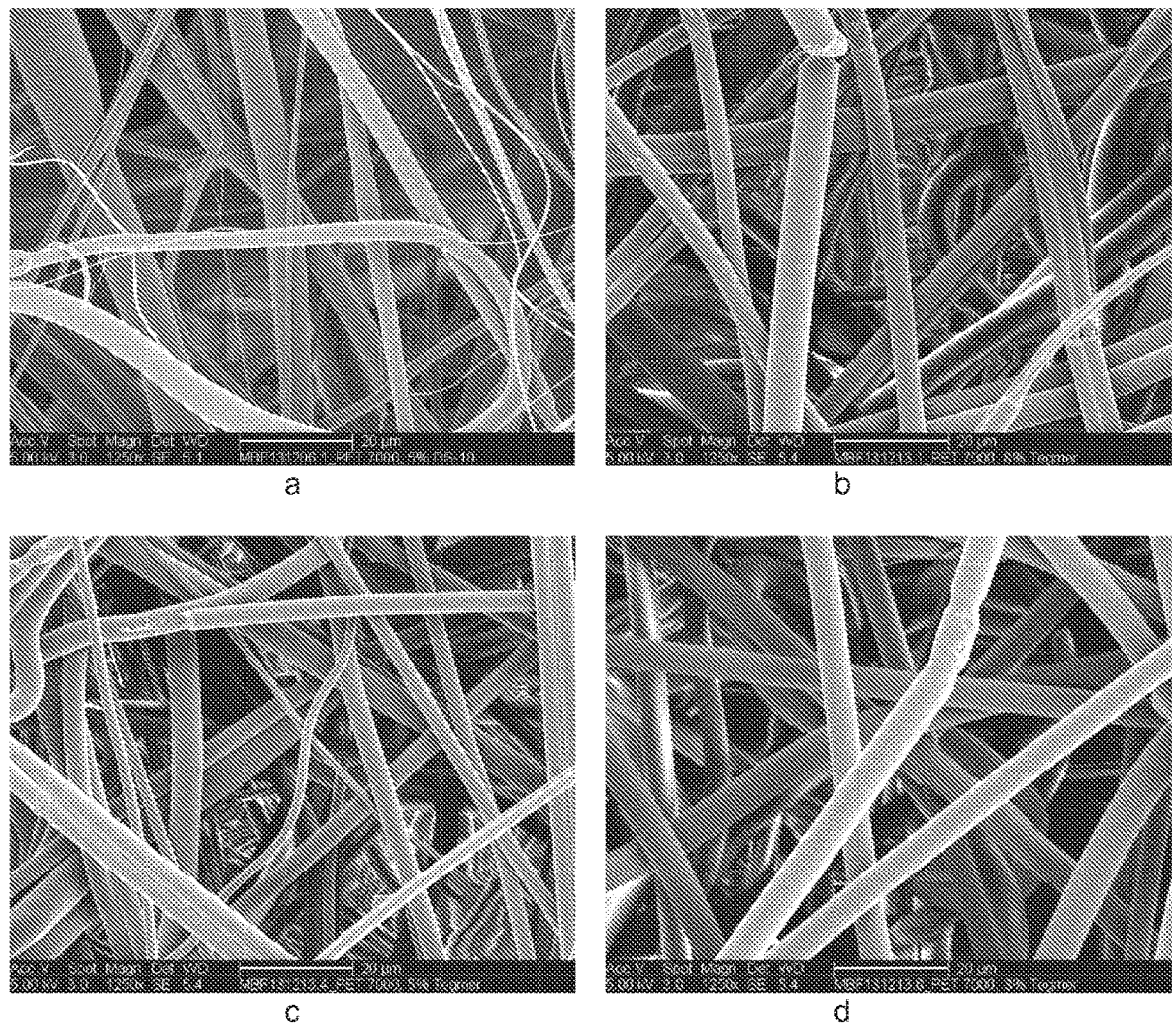
Fig. 12. SEM images of PET fiber sheets made with (a) 5 wt.% DS-10, (b) 8 wt.% TegMeR® 809, (c) 5 wt.% TegMeR® 809, and (d) 3 wt.% TegMeR® 809.

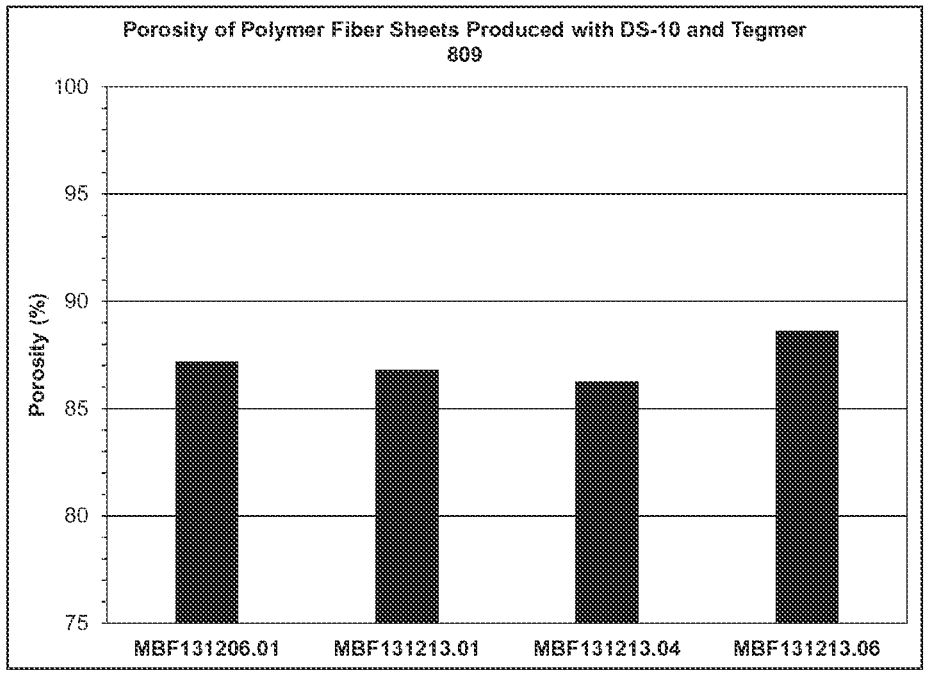
Fig. 13. Porosity of PET fiber sheets.
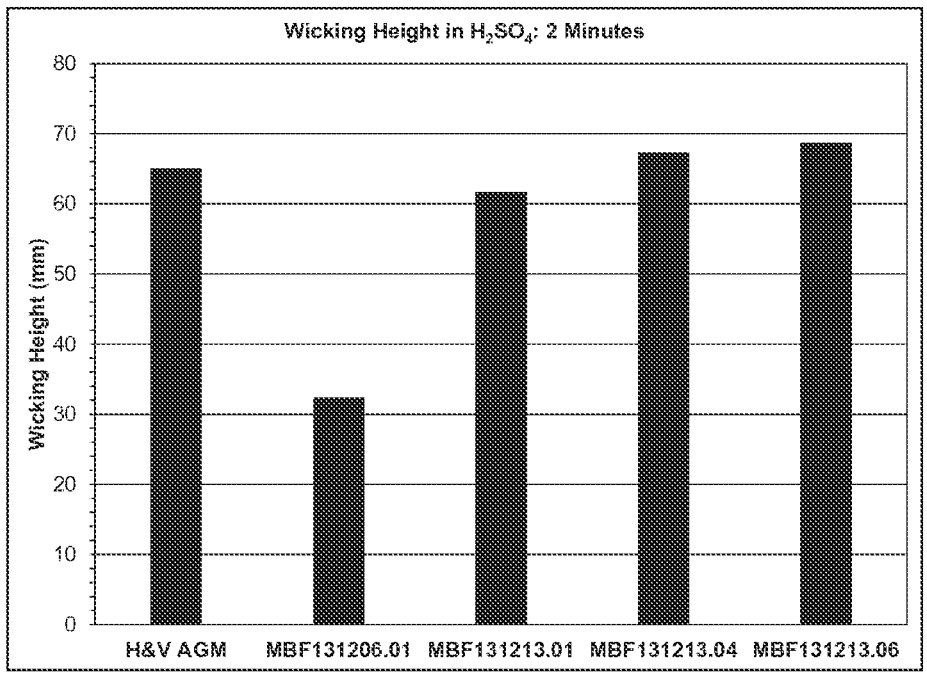
Fig. 14. Two-minute wicking height of PET fiber sheets in sulfuric acid.

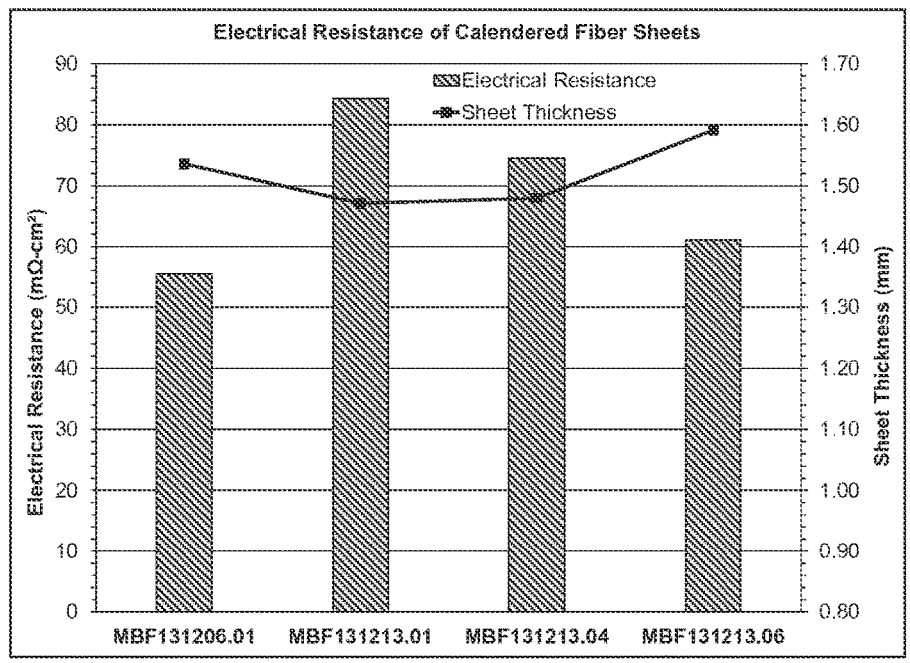
Fig. 15. Electrical resistance of PET fiber sheets in sulfuric acid.
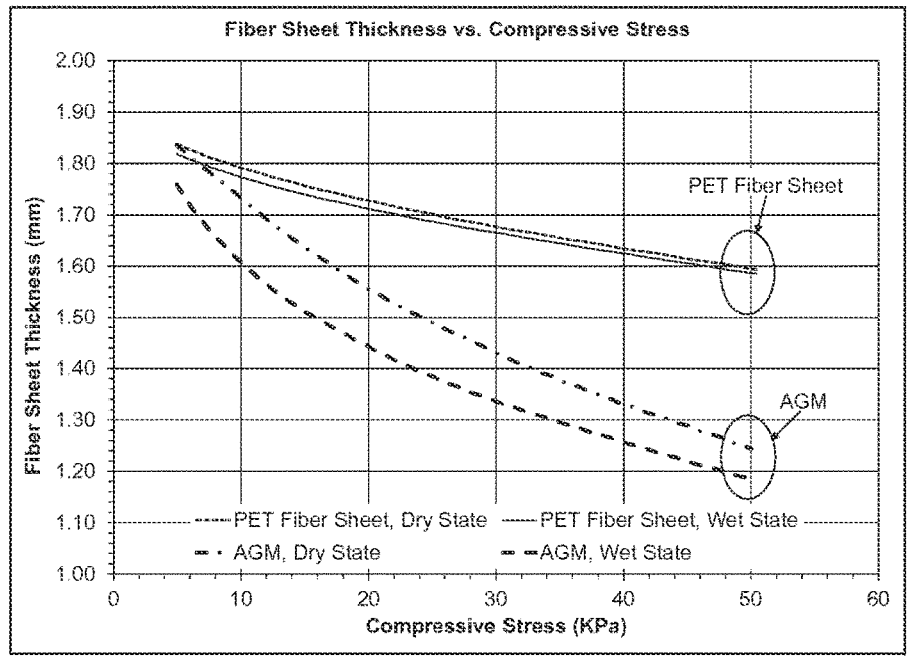
Fig. 16. Change in thickness vs. applied compressive stress for AGM and PET fiber sheets. The tests were performed in both dry and wet states for each AGM and PET fiber sheet.

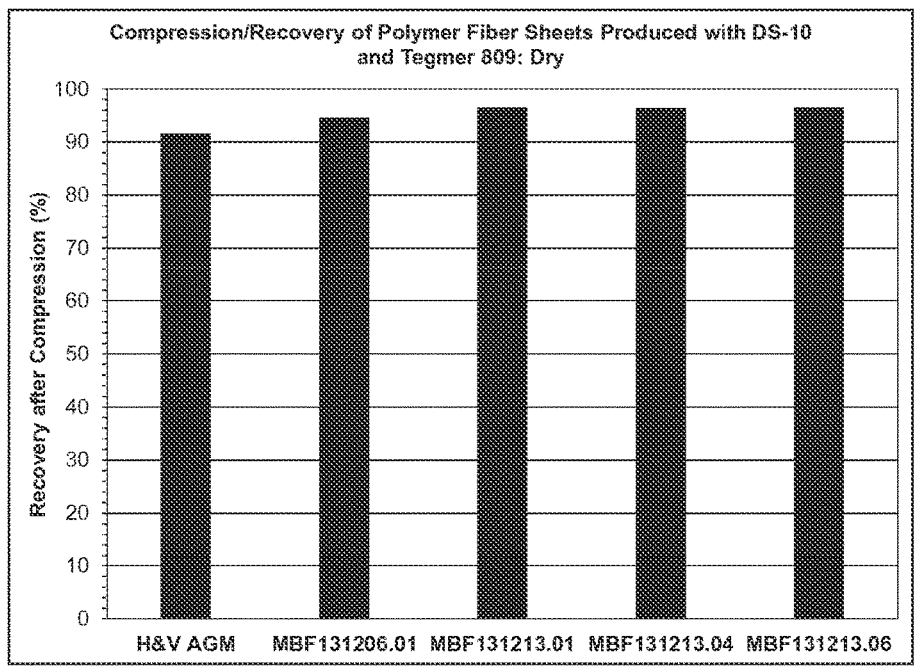
Fig. 17. Recovery after compression of PET fiber sheets with DS-10 and TegMeR® 809 – dry condition.
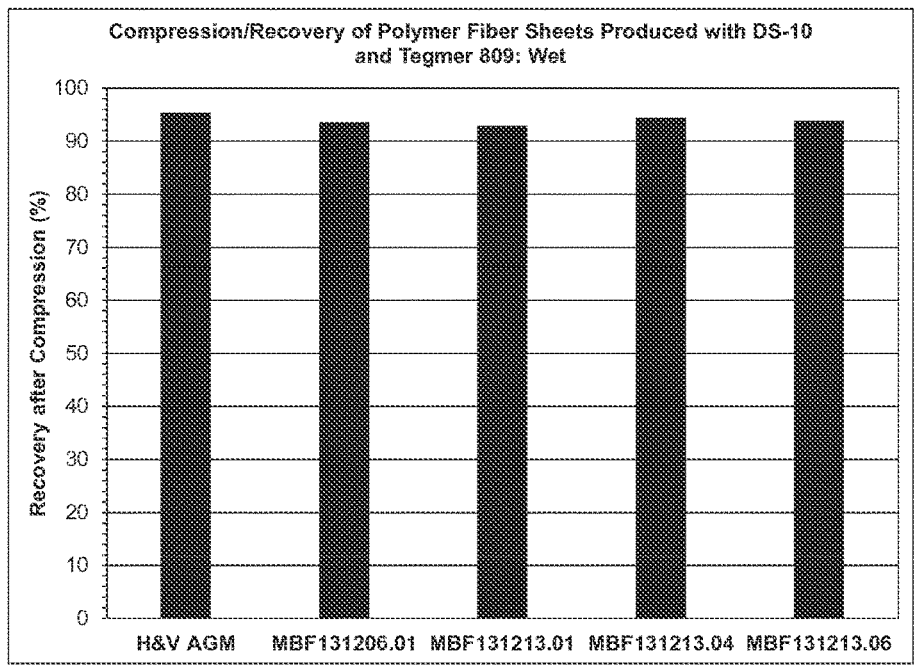
Fig. 18. Recovery after compression of PET fiber sheets with DS-10 and TegMeR® 809 – wet condition.

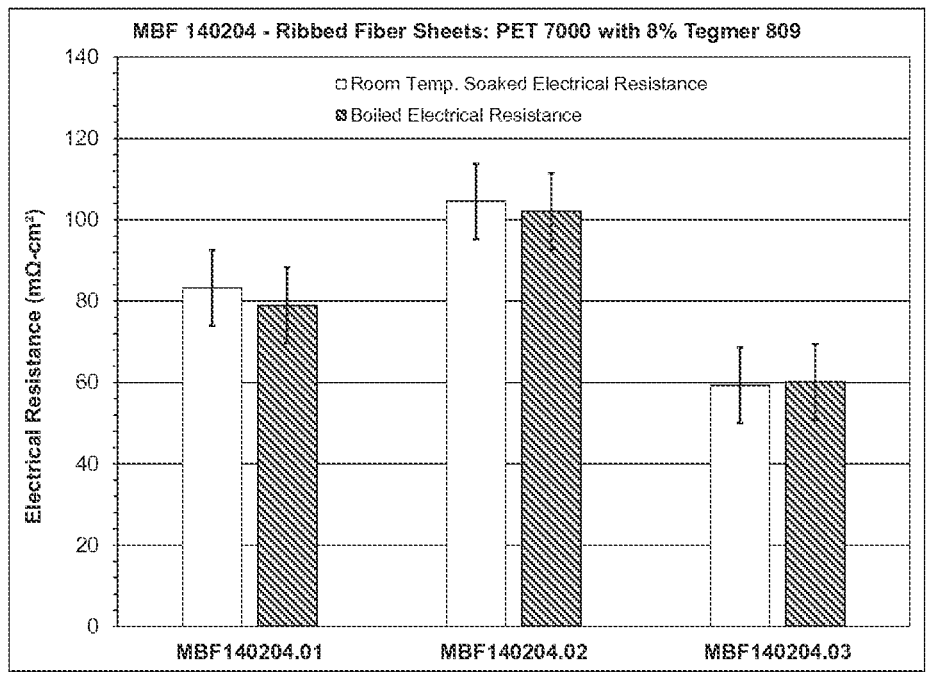
Fig. 19. Electrical resistance of ribbed PET fiber sheets.
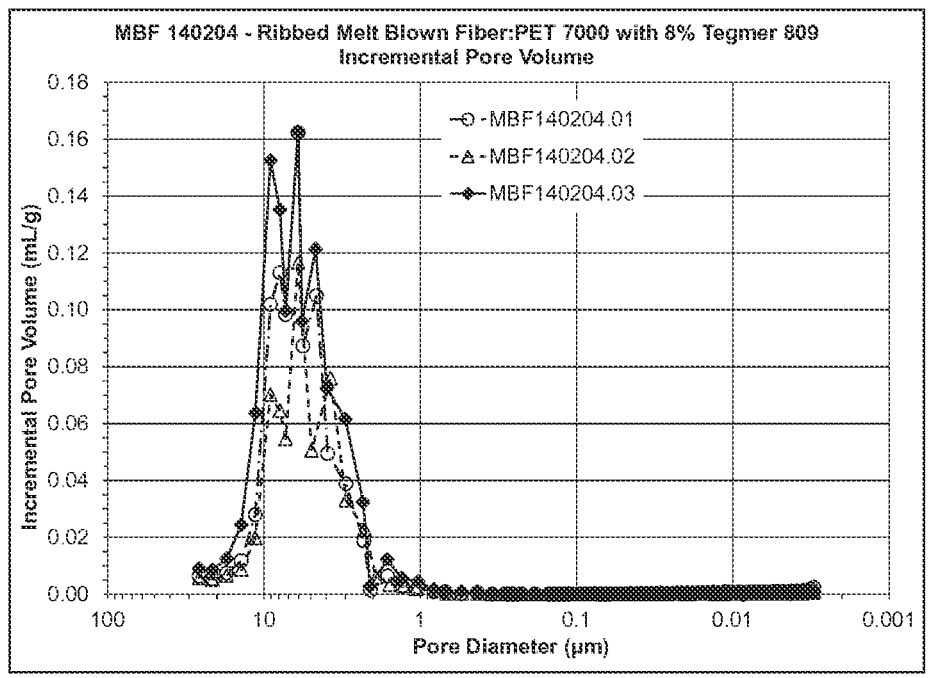
Fig. 20. Pore size distributions by mercury intrusion porosimetry of the ribbed PET fiber sheets.

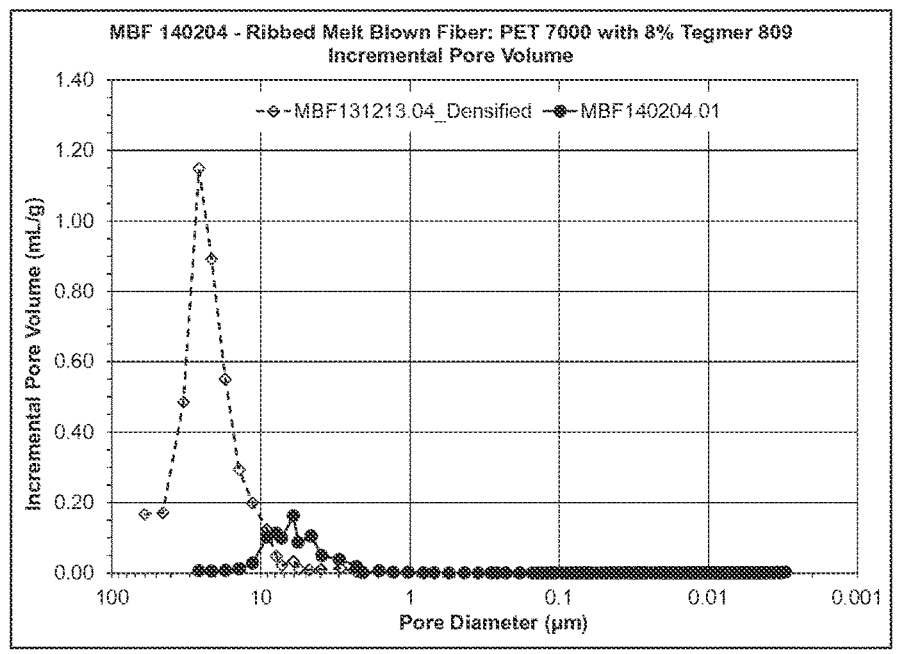
Fig. 21. Pore size distributions by mercury intrusion porosimetry of a densified PET fiber sheet and a ribbed PET fiber sheet.
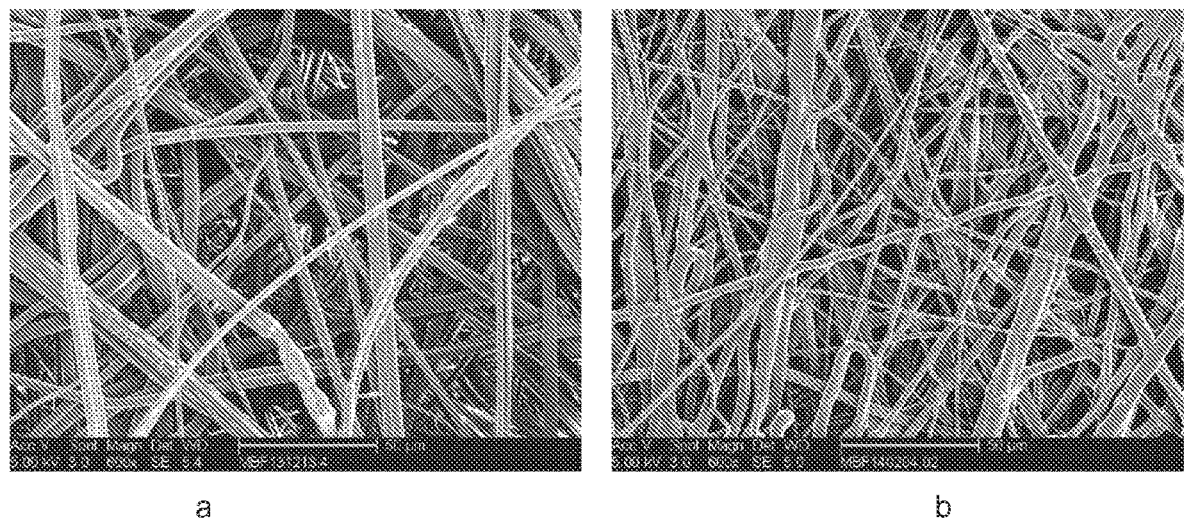
Fig. 22. SEMs of (a) densified PET fiber sheet and (b) ribbed PET fiber sheet.

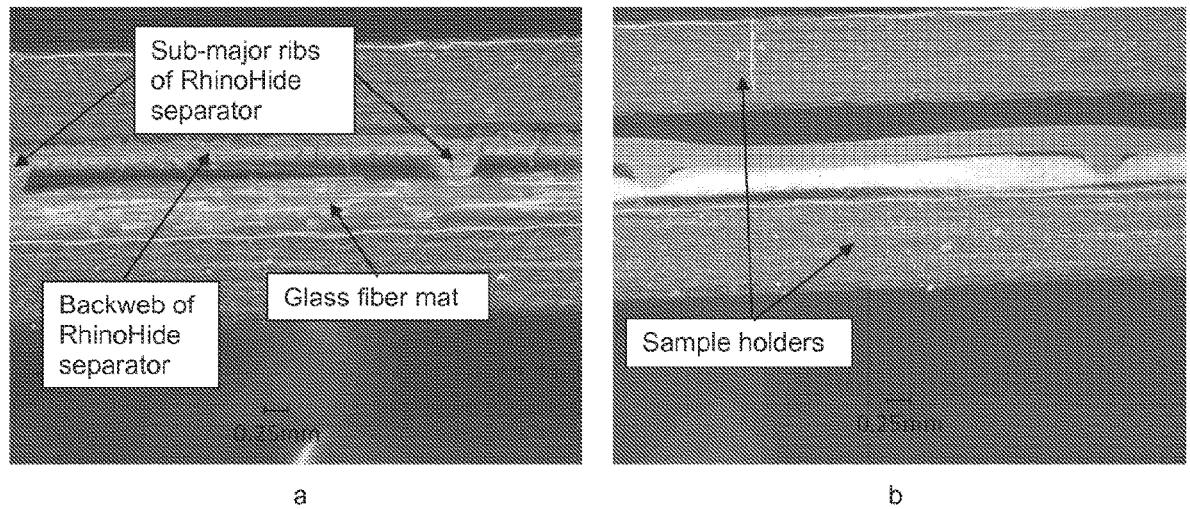
Fig. 23. Optical micrographs at the interfaces of (a) RhinoHide® separator-glass fiber mat and (b) RhinoHide® separator-PET fiber sheet.
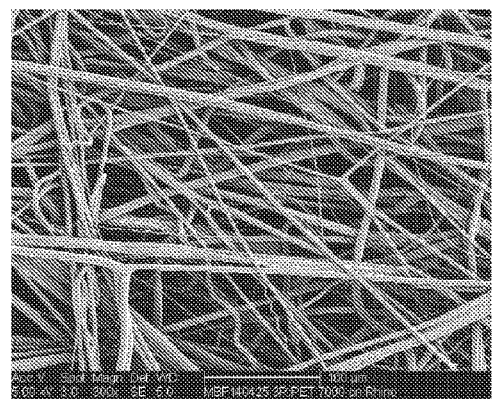
Fig. 24. SEM of the PET fiber sheet from RhinoHide® separator-PET fiber sheet composite.

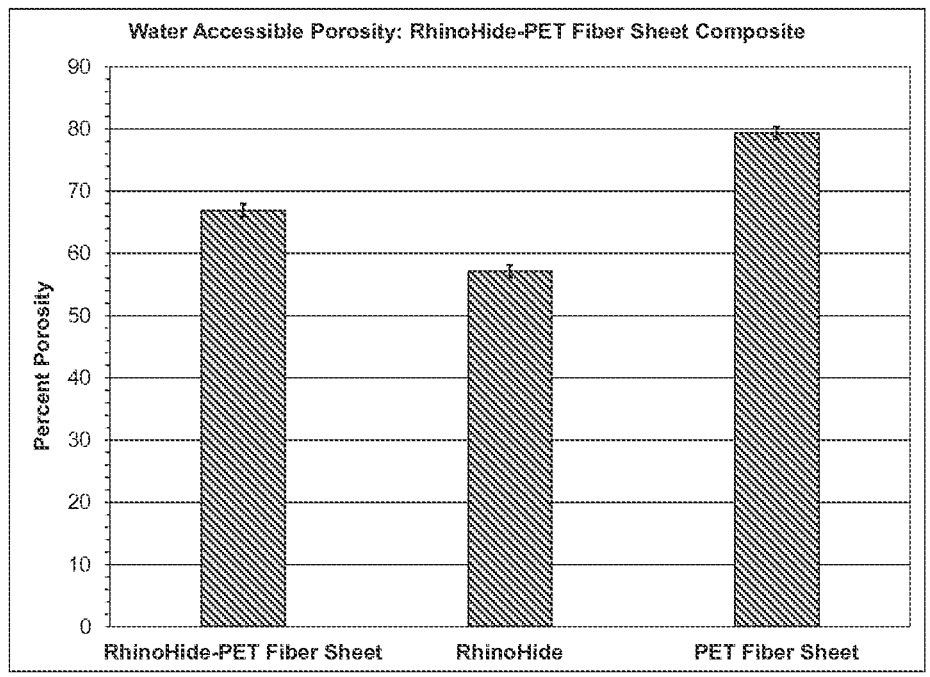
Fig. 25. Water accessible porosity of the RhinoHide® separator-PET fiber sheet composite and its components.
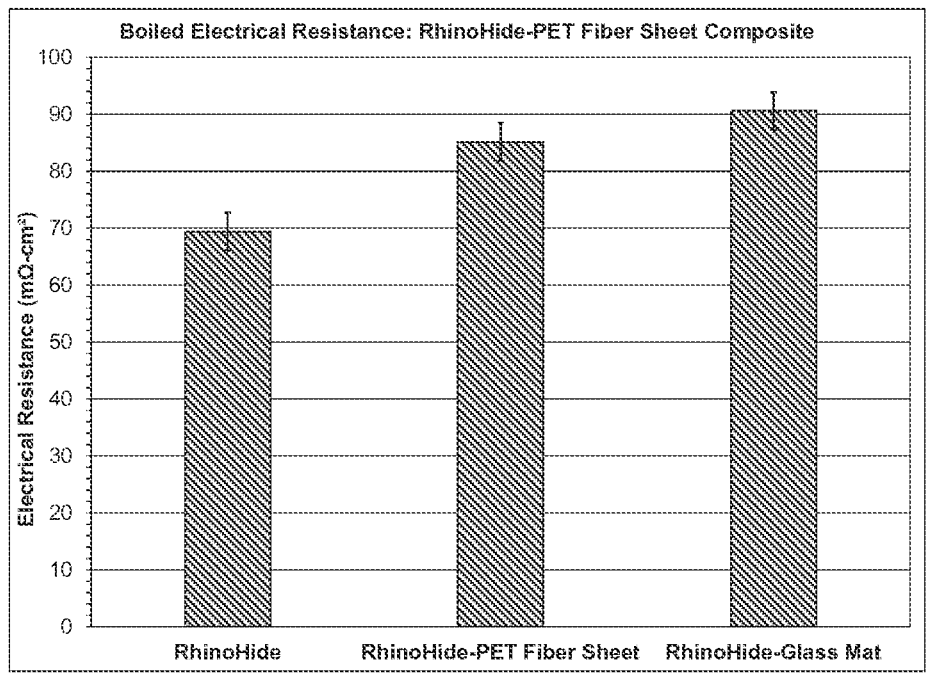
Fig. 26. Boiled electrical resistance of the traditional RhinoHide® separator-glass fiber mat laminate and the RhinoHide® separator-PET fiber sheet composite.

INSTANTANEOUSLY WETTABLE POLYMER FIBER SHEET

RELATED APPLICATION

This application claims benefit of U.S. patent application Ser. No. 61/864,317, filed Aug. 9, 2013.

COPYRIGHT NOTICE

® 2014 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to the integration of a fiber modifying agent functioning preferably as a plasticizer and surface modifying agent in extrusion and fiber formation processes performed in the production of a highly porous, polymer fiber sheet that is instantaneously wettable by an aqueous medium. The wettability of the sheet is sustained after multiple washing and drying steps. The resultant sheets can be used in lead-acid batteries, as produced or after further densification and embossing to form a pattern of ribs on the surfaces of the sheets.

BACKGROUND INFORMATION

The lead-acid storage battery is commonly found in two modes of design, the valve-regulated recombinant (valve-regulated lead-acid (VRLA)) cell and the flooded cell. Both modes include positive and negative electrodes that are separated from each other by a porous battery separator. The porous separator prevents the electrodes from coming into physical contact and provides space for an electrolyte to reside. Such separators are formed of materials that are resistant to the sulfuric acid electrolyte, readily wettable in sulfuric acid, and sufficiently porous to permit the electrolyte to reside in the pores of the separator material, thereby permitting ionic current flow between adjacent positive and negative plates with low resistance.

More recently, enhanced flooded batteries (EFB) have been developed to meet the high cycling requirements in "start-stop" or "micro-hybrid" vehicle applications. In such applications, the engine is shut off while the vehicle is stopped (e.g., at a traffic light) and then re-started afterwards. The advantage of a "start-stop" vehicle design is that it results in reduced $CO_2$ emissions and better overall fuel efficiency. A major challenge in "start-stop" vehicles is that the battery must continue to supply all electrical functions during the stopped phase while being able to supply sufficient current to re-start the engine at the required moment. In such cases, the battery must exhibit higher performance with respect to cycling and recharge capability as compared to a traditional flooded lead-acid battery design.

In the case of "start-stop" applications, valve-regulated lead-acid (VRLA) batteries have demonstrated good cycleability in the field, but they suffer from relatively high cost and other concerns.

Separators for lead-acid storage batteries have been formed of different materials as the technology has developed. Sheets of wood, paper, rubber, PVC, fiberglass, and silica-filled polyethylene have all found use over time. Currently, silica-filled polyethylene separators are used in automotive starting-lighting-ignition (SLI) batteries, while absorptive glass mat (AGM) separators are used in VRLA batteries. In the latter separators, the size and distribution of glass fibers govern the separator properties, including the porosity, which is generally greater than 90% prior to compression and electrolyte filling during the battery manufacturing process. In some cases, synthetic polymer fibers are mixed with the glass mat for improved mechanical properties (e.g., compression recovery), but these materials are still difficult for battery manufacturers to integrate into their production processes at the desired rates.

As such, there continues to be a need for a mechanically robust, acid resistant, high porosity, fiber mat that is instantaneously wettable and can be used throughout the life cycle of lead-acid storage batteries used in "start-stop" applications.

For silica-filled polyethylene separators used in flooded lead-acid batteries, the traditional manufacturing process includes extrusion, extraction followed by drying, slitting, and winding steps. Precipitated silica is typically combined with a polyolefin, a process oil, and various minor ingredients to form a separator mixture that is extruded at elevated temperature through a sheet die to form an oil-filled sheet. The oil-filled sheet is calendered to its desired thickness and profile, and the majority of the process oil is extracted. The sheet is dried to form a microporous polyolefin separator and is slit into an appropriate width for a specific battery design. During this manufacturing process, the extraction of the process oil and the drying of the extracting solvent are the limiting steps. The output of a production line depends on how fast the process oil can be removed and how quickly the solvent can be dried, both of which depend on the thickness of the separator products. Trichloroethylene (TOE) and hexane are commonly used as extracting solvents for the process oil, and they present challenges with respect to health, safety, and efficient recovery.

As such, there also continues to be a need for a flooded lead-acid type battery separator that is manufactured without the use of hazardous and/or flammable solvents. The separator should exhibit desired properties pertaining to flooded lead-acid batteries such as good wettability, high porosity, small pore size, low electrical resistance, high puncture strength, and good oxidation resistance.

SUMMARY OF THE DISCLOSURE

A polymer fiber sheet exhibits high porosity and good tensile properties in both a "we" state and a "dry" state. A fiber modifying agent is incorporated into the polymer extrusion and fiber formation process to produce a highly porous polymer fiber sheet that is instantaneously wettable by an aqueous medium. The fiber modifying agent serves two principal purposes or functions. The fiber modifying agent functions as either one or both (1) a plasticizer that reduces the polymer extrudate melt viscosity and allows the formation of fine fibers during processing and (2) a surface modifying agent that promotes the instantaneous and sustained wettability of individual polymer fibers and a porous fiber sheet formed from them. The fiber modifying agent can be an individual chemical compound, oligomer, polymer, or a mixture of them that can achieve at least one of the stated functions. The fiber modifying agent is stable and resistant to thermal degradation during extrusion. The polymer fiber sheet maintains its wettability even after repeated washing and drying cycles. The resultant fiber sheet can be densified and embossed to provide a desired thickness and porosity, while at the same time ribs with a desired pattern can also be formed on the fiber sheet.

Preferred fiber modifying agents that can function as a plasticizer for polymers such as polyethylene terephthalate (PET), polystyrene, polyacrylate, or other sulfuric acid stable polymers include di-n-butyl phthalate, diundecyl phthalate, di-2-ethylhexyl phthalate, n-hexyl laurate, di-2-ethylhexyl sebacate, di-2-ethylhexyl adipate, and di-2-ethylhexyl azelate.

Preferred fiber modifying agents that can function as surface modifying agents for polyethylene terephthalate (PET), polybutylene terephthalate (PBT), polyphenylene sulfide (PPS), or other sulfuric acid stable polymers include sodium dodecylbenzene sulfonate, sodium dibutyl naphthalene sulfonate (Solvay, BX-78), sodium diisopropyl naphthalene sulfonate (Cytec, Aerosol OS), and sodium dioctyl sulfosuccinate (Cytec, Aerosol OT-B).

The most preferred fiber modifying agents can function as both a plasticizer and a surface modifying agent, including di-butoxyethoxy ethyl adipate, triethylene glycol 2-ethylhexanoate, triethylene glycol dibenzoate, Plasthall 7050 (dialkyl diether glutarate, Hallstar Company), Plasthall 7071 (polyethylene glycol ester, Hallstar Company), Uniplex 810 (polyethylene glycol-600 dilaurate, Unitex Chemical Corporation), TegMeR® 809 (polyethylene glycol-400 di-2-ethylhexanoate, Hallstar Company), TegMeR® 810 (polyethylene glycol ester, Hallstar Company), and TegMeR® 812 (polyethylene glycol ester, Hallstar Company).

Additional aspects and advantages will be apparent from the following detailed description of preferred embodiments, which proceeds with reference to the accompanying drawings.

BRIEF DESCRIPTION OF THE DRAWINGS

FIG. 1 is a scanning electron micrograph of a neat polybutylene terephthalate (PBT) fiber sheet.

FIG. 2 is a graph showing the porosity of PBT fiber sheets measured before and after densification.

FIG. 3 is a graph showing comparative recovery after compression results for PBT fiber sheets and two commercial grades of absorptive glass mats.

FIG. 4 is a photograph of a calendered PBT fiber sheet with longitudinal ribs.

FIG. 5 shows side-by-side photographs demonstrating the wetting behavior of densified PET fiber sheets coated with a MA-80I surfactant (left side) and a TegMeR® 809 surface modifying agent (right side).

FIG. 6 is a set of curves showing the fiber size distribution of polymer fiber sheets prepared with a PET resin having different intrinsic viscosities using a TegMeR® 809 plasticizer.

FIG. 7 is a set of four scanning electron micrographs of melt blown polymer fiber sheets prepared from neat PET (SEM (a)) and PET resins of different types with a TegMeR® 809 plasticizer (SEMs (b), (c), and (d)).

FIGS. 8, 9, 10, and 11 are graphs summarizing, respectively, porosity, two-minute wicking height, room temperature-soaked electrical resistance, and compression recovery of the polymer fiber sheets produced with different PET resins.

FIG. 12 is a set of four scanning electron micrographs of polymer fiber sheets made with a sodium dodecylbenzene sulfonate surface modifying agent and a TegMeR® 809 fiber modifying agent.

FIGS. 13, 14, and 15 are graphs showing, respectively, porosity, two-minute wicking height in sulfuric acid, and electrical resistance of the PET fiber sheets shown in FIG. 12.

FIG. 16 is a graph showing change in thickness versus applied compressive stress for AGMs and PET fiber sheets.

FIGS. 17 and 18 are graphs showing, in comparison with AGM, recovery after compression results for polymer fiber sheets manufactured with a sodium dodecylbenzene sulfonate surface modifying agent and a TegMeR® 809 fiber modifying agent in, respectively, a dry condition and a wet condition.

FIG. 19 is a graph showing the electrical resistance of ribbed PET fiber sheets in sulfuric acid.

FIG. 20 is a graph showing a set of curves representing pore size distributions of three ribbed PET fiber sheets.

FIG. 21 is a graph showing pore size distribution of a densified PET fiber sheet and a ribbed PET fiber sheet.

FIG. 22 is a set of two scanning electron micrographs of a densified PET fiber sheet (SEM (a)) and a ribbed melt PET fiber sheet (SEM (b)).

FIG. 23 is a set of two optical micrographs showing the interfaces between two sub-major ribs of a conventional RhinoHide® separator-glass fiber mat laminate (micrograph (a)) and a RhinoHide® separator-PET fiber sheet composite (micrograph (b)).

FIG. 24 is a scanning electron micrograph of the PET sheet from the RhinoHide®-separator PET fiber sheet composite of FIG. 23 (micrograph (b)).

FIG. 25 is a graph showing, with reference to FIG. 23 (micrograph (b)), water accessible porosity of the RhinoHide®-PET fiber sheet composite and its components.

FIG. 26 is a graph showing, with reference to FIG. 23 micrograph (a) and (b), boiled electrical resistance of the RhinoHide® separator-glass fiber mat laminate and the RhinoHide® separator-PET fiber sheet composite.

DETAILED DESCRIPTION OF PREFERRED EMBODIMENTS

The disclosed polymer fiber sheet is a three-dimensional matrix of polymer fibers and has a thickness throughout which interconnecting pores communicate. The polymer fiber sheet is characterized by high porosity (50% to greater than 80%), controlled pore size distribution, and a fiber modifying agent distributed throughout the polymer fiber matrix to provide both instantaneous and sustained wettability. A non-planar surface topography can be imparted to one or both surfaces of the three-dimensional matrix of polymer fibers. This is preferably done by forming a pattern by embossing, calendering, or densification of the polymer fiber sheet. A typical example is a desired pattern of ribs formed on the fiber sheet.

The following description of polymer fiber formation is presented with reference to the production of melt blown fiber sheets. Skilled persons will appreciate that the disclosed polymer fibers can be manufactured with use of processes other than a melt blowing process, such as electrospinning, fiber spinning including melt spinning and solution spinning, electroblowing, force spinning, and melt spinning by cold air attenuation (i.e., melt blowing with cold/room temperature compressed air through a Laval nozzle).

Melt blown polymer fiber sheets are traditionally produced from thermoplastic polymers having low intrinsic viscosity or high melt flow index. The majority of these polymers are polypropylene (PP), polyethylene (PE), and sometimes polyester. Bi-component melt blown fiber sheets are also manufactured in a core-sheath configuration. The core is usually composed of a polymer (e.g., PET) with a high melting temperature, and the sheath is composed of a polymer (e.g., PP) with a significantly lower melt temperature.

In the manufacture of melt blown fiber sheets, a polymer is melted in an extruder. A melt pump meters the melted extrudate to a melt blown die. The melt blown die is the heart of the melt blown technology and is typically comprised of many orifices each having a small diameter through which the polymer melt travels, surrounded by two air knives for the passage of heated process air. The heated air at high velocity attenuates the polymer melt as it exits the orifices, generating a stream of small diameter fibers. The fibers are deposited on a collector belt as a sheet, which is wound into rolls. In a preferred embodiment, the melt blown fiber sheet is formed by melt blowing thermoplastic resins such as polyolefin, polystyrene, polyester, and polyphenylene sulfide that are chemically stable with sulfuric acid.

Producing melt blown fibers with fine fiber sizes entails reducing the extrudate melt viscosity, in combination with increasing process air temperature and flow rate. This has been done by selecting polymers with low intrinsic viscosity/high melt flow index. Alternatively, the low melt viscosity can be achieved by operating the extruder and die at temperatures significantly higher than the melting point of the polymer. This approach poses the risk of accelerating thermal-degradation of the polymers. For polymers, such as polyethylene terephthalate (PET), which is very sensitive to hydrolytic degradation, the high operating temperature becomes of greater concern. Another method of achieving low melt viscosity for polymers with high intrinsic viscosity entails purposefully adding an oxidative agent during the extrusion process. The oxidative species will shorten the molecular chain length of the polymers, thereby lowering the melt viscosity. However, such remedy will negatively impact the mechanical strength of the fibers.

In a preferred embodiment, fiber modifying agents functioning as a plasticizer are utilized in the melt blowing process to reduce the extrudate melt viscosity, allowing for the production of melt blown fibers using polymers with high intrinsic viscosity. In addition to viscosity reduction, the plasticizers also lower the glass transition temperature of the polymers and permit lower processing temperatures. A suitable plasticizer can be fed to the extruder at the feed zone or further downstream where it is homogenously mixed with a polymer, creating a low viscosity polymer melt that is suitable for the production of fine melt-blown fibers. Alternatively, the plasticizer can be introduced to the polymer during the production of pellets or granules for subsequent use or processing. The fibers are deposited as a sheet on a collector belt, and the fiber sheet can be further calendered to its desired thickness or porosity if necessary.

The desired plasticizers are thermally stable at the operating temperatures throughout the extrusion and melt blowing process, are preferably used at a relatively low concentration, are insoluble in sulfuric acid, and do not negatively impact the chemistry of the lead-acid battery. Plasticizers preferred for use in the manufacture of the disclosed polymer fiber sheets are those in a group of fiber modifying agents that can function as a plasticizer for polymers such as PET, polystyrene, polyolefin, polyacrylate, or other sulfuric acid stable polymers. Such plasticizers include di-n-butyl phthalate, diundecyl phthalate, di-2-ethylhexyl phthalate, n-hexyl laurate, di-2-ethylhexyl sebacate, di-2-ethylhexyl adipate, and di-2-ethylhexyl azelate.

Traditional melt blown polymer fiber sheets cannot be used in lead-acid battery applications because the polymers are hydrophobic or exhibit low hydrophilicity. One approach to render the fiber sheet wettable is to incorporate a hydrophilic inorganic filler such as silica into the fibers. The silica can be combined with the polymer at the feed zone of the extruder. Another approach to address the problem is to apply a surfactant to the fiber sheet in a secondary process. In this process, the surfactant can be applied to the fiber sheet by dip coating the sheet in a bath of a surfactant solution, by spraying a surfactant solution onto the fiber sheet, or by grafting a highly hydrophilic polymer to the fiber sheet.

On the other hand, good wettability can be imparted to the fibers without the need for a secondary process. Preferred fiber modifying agents that can function as surface modifying agents for PET, PBT, PPS, or other sulfuric acid stable polymers include sodium dodecylbenzene sulfonate, sodium dibutyl naphthalene sulfonate, sodium diisopropyl naphthalene sulfonate, and sodium dioctyl sulfosuccinate.

A surface modifying agent that is thermally and chemically stable at the elevated temperatures (200° C.-350° C.) used in extrusion is preferred. The solid surface modifying agent also has a melting temperature at or below the melting temperature of the polymer being used. It is also desired that the surface modifying agents become "anchored" to the polymer fiber matrix such that the surface modifying agent cannot be easily removed or washed away, thereby sustaining the wettability of the sheet by an aqueous medium such as water or sulfuric acid. Finally, controlling the percent porosity and pore size distribution of the polymer fiber sheet contributes to achieving low electrical (ionic) resistance in battery applications. A preferred ionic surface modifying agent is sodium dodecylbenzene sulfonate, which has a melting point of 205° C., and is compatible with the extrusion and fiber formation of polyethylene terephthalate (PET), polybutylene terephthalate (PBT), and polyphenylene sulfide (PPS). It is believed that surface modifying agents including surfactants with long alkyl side chains, such as sodium dodecylbenzene sulfonate, can interact with many polymers during the extrusion process such that the surfactants become "anchored" to the polymer fiber matrix and cannot be easily washed away.

The most preferred fiber modifying agent is one that can function as both a plasticizer and a surface modifying agent and is added to the polymer of interest during the melt blowing process to provide the polymer fiber sheet with an instantaneously wettable characteristic. This fiber modifying agent can be introduced to the extruder at the feed zone or downstream where it is homogenously mixed with the polymer before being attenuated into fibers. Alternatively, this fiber modifying agent can be introduced to the polymer during the production of polymer pellets or granules for subsequent use or processing. The fibers are deposited as a sheet on a collector belt, and the fiber sheet can be further calendered to its desired thickness or porosity if necessary.

The most preferred fiber modifying agents are thermally stable at the operating temperature throughout the extrusion and melt blowing process, are preferably used at a relatively low concentration, are insoluble in sulfuric acid, and do not negatively impact the chemistry of the lead-acid battery. The most preferred fiber modifying agents include di-butoxyethoxy ethyl adipate, triethylene glycol 2-ethylhexanoate, triethylene glycol dibenzoate, dialkyl diether glutarate, polyethylene glycol-600 dilaurate, polyethylene glycol-400 di-2-ethylhexanoate, and members of the polyethylene glycol ester family.

The high compatibility of the most preferred fiber modifying agents with the polymers of interest ensures that the fiber modifying agents are homogeneously distributed throughout (i.e., do not phase separate in) the polymer fiber, resulting in a fiber sheet that is uniformly wettable. In addition, the fiber modifying agents functioning as surface modifying agents interact strongly with the polymers and are "anchored" to the polymer fiber matrix. Consequently, the resultant fiber sheet exhibits a durable wetting characteristic in which it remains wettable after many washing and drying cycles with/from water.

In a preferred embodiment, fiber modifying agents are combined with the polymers of interest during the melt blowing process. The mixtures are extruded through a melt blown die and attenuated into fibers, which are deposited as a sheer on a collector belt. The resultant fiber sheet can be further calendered to its desired thickness or porosity, if necessary.

In another preferred embodiment, a surface pattern is embossed on the polymer sheet. For example, longitudinal ribs are patterned onto the melt blown fiber sheet. The longitudinal ribs are formed by simultaneously collecting and compressing the attenuated fibers between a pair of nip rolls. The nip rolls are comprised of a patterned roll with grooves and a smooth roll, both of which may be heated to an elevated temperature. Furthermore, the nip rolls can be made perforated so that they also serve as vacuum rolls to aid the collection of fibers. The longitudinal ribs can be formed in a secondary process in which the polymer fiber sheet is passed through heated nip rolls, comprising a patterned roll with grooves and a smooth roll. In both cases, the fiber sheet with longitudinal ribs is compressed such that a desired thickness and porosity is achieved.

The polymer fiber sheet can also be calendered between two smooth rolls to the desired thickness and porosity, followed by the addition of a surface pattern, e.g., ribs. As one example, a mixture of polypropylene and oil is extruded as ribs onto the surface of the flat calendered polymer sheet.

A bi-layer composite can be manufactured in a single step by having two melt-blown dies, separated by a distance, in series within a single production line. The diameter of the orifices in one melt-blown die can be made smaller than the diameter of the orifices in the other die. An extruder feeds extrudate to two metering melt pumps, which in turn feeds extrudate to the two melt-blown dies at two different flow rates by individually controlling their speeds. The differences in the orifice sizes of the two dies and the extrudate flow rates to the dies allow for the production of two separate fiber streams, each with its own fiber size distribution. A fiber sheet collected from the first melt-blown die downstream of the production line is conveyed via a perforated conveyor belt to the second melt-blown die, where a second layer of fiber sheet is deposited. The resulting bi-layer composite is then calendered to achieve desired properties.

Melt-blown composite fiber sheets can also be produced with two or more layers, and each layer can be a different polymer and have a distinct fiber diameter. One example is a polypropylene-polyethylene terephthalate (PET) bi-layer composite. Additionally, within the same composite, one layer can be made hydrophobic, while another layer can be made hydrophilic. Subsequent calendering processing would tailor the composite to the desired physical properties including thickness, density, porosity, and pore size distribution.

EXAMPLE 1

Eight samples of polymer fiber sheets were manufactured on a pilot line at Biax-FiberFilm (Greenville, Wis.) using a single screw extruder (American Kuhne; 1 inch (2.54 cm) diameter; 24:1 Length:Diameter) under the conditions set forth in Table 1. A melt blown die manufactured by Biax-FiberFilm Corporation (Greenville, Wis.) was used in the melt blowing process. The die was 15 inches (38 cm) wide and constructed with 4 rows of orifices, each of which having a 0.009 inch (0.23 mm) diameter. Polybutylene terephthalate pellets (PBT 2008; Celanese), both with and without sodium dodecylbenzene sulfonate (Solvay-Rhodacal DS-10), were separately converted into fiber sheets. The DS-10 loading level used in the pellets was 10 wt. %. In this example, the DS-10 fiber modifying agent functions as a surface modifying agent.

FIG. 1 shows a scanning electron micrograph (SEM) of a neat PBT fiber sheet, taken on a FEI Sirion XL30 SEM at 5.0 kV accelerating voltage. In general, the fiber diameters were between 0.7 μm and 7 μm.

Six of the eight samples shown on Table 1 were further densified at elevated temperature using a two-roll calender.

TABLE 1

Process conditions used to produce PBT fiber sheets, with and without DS-10 surface modifying agent.

| | Roll # | | | | | | | |
|---|---|---|---|---|---|---|---|---|
| | 051513-2 | 051513-3 | 051513-4 | 051613-5 | 051613-6 | 051613-7 | 051613-8 | 051613-9 |
| | Polymer | | | | | | | |
| | PBT 2008 Neat | PBT 2008 Neat | PBT 2008 Neat | PBT 2008 Neat | PBT 2008 10% DS- | PBT 2008 10% DS- | PBT 2008 10% DS- | PBT 2008 10% DS- |
| Die Temperature, actual (° F.) | 480 | 480 | 480 | 480 | 480 | 500 | 520 | 550 |
| Extruder Speed (rpm) | 80 | 80 | 80 | 80 | 70 | 70 | 70 | 70 |
| Melt Temperature (° F.) | 486 | 486 | 486 | 486 | 486 | 505 | 530 | 559 |
| Melt Pressure (psi) | 1375 | 1375 | 1375 | 1250 | 1330 | 1256 | 1230 | 1109 |
| Air Temperature Setpoint (° F.) | 480 | 480 | 480 | 505 | 480 | 480 | 480 | 480 |
| Air Temperature at Die (° F.) | 480 | 480 | 480 | 505 | 480 | 480 | 480 | 480 |
| Heat Exchanger (° F.) | 510 | 510 | 510 | 549 | 516 | 516 | 514 | 514 |
| Air Pressure at Die (psi) | 7.3 | 7.3 | 7.3 | 5.1 | 4.4 | 4.4 | 4.4 | 4.4 |

TABLE 1-continued

Process conditions used to produce PBT fiber sheets, with and without DS-10 surface modifying agent.

| | Roll # | | | | | | | |
|---|---|---|---|---|---|---|---|---|
| | 051513-2 | 051513-3 | 051513-4 | 051613-5 | 051613-6 | 051613-7 | 051613-8 | 051613-9 |
| | Polymer | | | | | | | |
| | PBT 2008 Neat | PBT 2008 Neat | PBT 2008 Neat | PBT 2008 Neat | PBT 2008 10% DS- | PBT 2008 10% DS- | PBT 2008 10% DS- | PBT 2008 10% DS- |
| Blower Speed (%) | 42 | 42 | 42 | 39 | 35 | 35 | 35 | 35 |
| Die-to-Collector Distance (in.) | 8 | 8 | 8 | 9 | 8.5 | 8.5 | 8.5 | 8.5 |
| Collector Speed (fpm) | 5 | 4 | 3 | 3 | 3 | 3 | 3 | 3 |
| Collector Vacuum (%) | 30 | 30 | 30 | 50 | 50 | 50 | 50 | 50 |
| Basis wt (gsm) | 95 | | | 168 | 188 | 174 | 196 | 159 |
| Thickness (mm) | 0.55 | 0.77 | 0.85 | 1.14 | 0.93 | 0.84 | 0.93 | 0.88 |
| Porosity (%) | 89 | 90 | 90 | 90 | 84 | 83 | 83 | 81 |
| Porosity, densified (%) | 82 | 83 | | 84 | 78 | 76 | | 75 |

The porosity of the samples was measured both before and after densification, as shown in FIG. 2. The surface modifying agent-containing fiber sheets had lower porosities than the porosities of the fiber sheets made with the neat polymer, but only the former sheets were wettable by water or battery acid.

The recovery after compression of the polymer fiber sheets was compared to that of two commercial grades (Hollingsworth & Vose Company and Shida Separator Co, Ltd.) of absorptive glass mat (AGM). An Instron universal tester was employed in this test. Loads of 20 kPa, 50 kPa, and 20 kPa were successively applied to the samples, and thereafter the relative change in thickness between the first and second 20 kPa loads was calculated. For some lead-acid battery manufacturers, a minimum recovery of 93% is required. As shown in FIG. 3, as compared to the AGM samples, the densified PBT fiber sheets performed particularly well in this test for recovery after compression.

The durability of wetting characteristic of the polymer fiber sheets was evaluated by repeatedly washing in water. A 2-inch×3-inch (50-mm×75-mm) coupon was cut from a densified fiber sheet sample containing 10% DS-10 (roll #051613-9 in Table 2). The coupon was washed in a beaker containing 3000 cc of de-ionized water at room temperature under continuous agitation for 1 hour. After washing, the coupon was blotted dry, and then dried in a convection oven at 70° C. for 30 minutes to remove the water. A wettability test was performed by placing droplets of water on the surface of the fiber sheet. The washing/drying cycle was repeated three times. Table 2 below indicates that the polymer fiber sheet exhibits sustained wettability, i.e., it remains instantaneously wettable after repeated washing in and drying from water.

TABLE 2

Sustained wetting behavior of a polymer fiber mat produced with DS-10 surface modifying agent.

| | | Surface Modifying | Wettaility by water | | | |
|---|---|---|---|---|---|---|
| Fiber Sheet ID | Resin | Agent | As made | After 1st wash | After 2nd wash | After 3rd wash |
| 051613-9 | PBT 2008 | 10.0% DS-10 | Instantaneously wettable | Instantaneously wettable | Instantaneously wettable | Instantaneously wettable |

EXAMPLE 2

A polymer fiber sheet was manufactured on a pilot line at Biax-FiberFilm (Greenville, Wis.) using a single screw extruder (American Kuhne; 1 inch (2.54 cm) diameter; 24:1 Length:Diameter) under the conditions shown in Table 3. A melt blown die manufactured by Biax-FiberFilm Corporation (Greenville, Wis.) was used in the melt blowing process. The die was 15 inches (38 cm) wide and constructed with 4 rows of orifices, each of which having a 0.009 (0.23 mm) diameter. Polybutylene terephthalate pellets (PBT 2008; Celanese) with a solid sodium dodecylbenzene sulfonate (Solvay-Rhodacal DS-10) were converted into a fiber sheet with a thickness of 1.3 mm. The DS-10 loading level used in the pellets was 5 wt. %. In this example, the DS-10 fiber modifying agent functions as a surface modifying agent.

TABLE 3

Process parameters for the PBT fiber sheet sample produced on a melt blown pilot line at Biax-FiberFilm.

| Roll ID | Polymer | Surface Modifying Agent | Extruder Speed (rpm) | Melt Temperature (° C.) | Melt Pressure (psi) | Air Temperature At Die (° C.) | Air Pressure at Die (psi) | Die-to-Collector Distance (in.) | Through-Put (lb/hr) |
|---|---|---|---|---|---|---|---|---|---|
| Biax 130731-2 | PBT 2008 | 5% DS-10 | 100 | 253 | 1780 | 249 | 5.9 | 10.5 | 8.4 |

The resultant fiber sheet was passed through a heated calender stack, comprising of a patterned roll with grooves running along the circumference of the roll and a smooth roll. The surface temperature for both rolls was 175° C. The gap between the two rolls was set at 0.51 mm. The two rolls were counter-rotated at a speed of 1 ft/min (30.5 cm/min). The fiber sheet produced thus contained longitudinal ribs.

Puncture strength on the backweb, which is the region between two longitudinal ribs, was measured with an Instron universal tester. The puncture pin used in the test was 1.9 mm in diameter, and the crosshead speed was 500 mm/min. The obtained puncture force, in unit of N, was divided by the backweb thickness to yield the normalized puncture strength in unit of N/mm. Density and porosity of the sample were calculated from the dimensions and mass of the sample. The boiled electrical resistance of the calendered fiber sheet was measured after boiling the sheet in de-ionized water for 10 minutes, followed by soaking the sample in sulfuric acid (specific gravity=1.28) at room temperature for 20 minutes (BCIS-03B3). Measurement was carried out in sulfuric acid (specific gravity=1.28) at 80° F. (26.7° C.) using a Palico Low Resistance Measuring System—Model 9100-2 (Caltronics Design and Assembly, Inc.). The obtained resistance, expressed in mΩ, was multiplied by the aperture area of the Palico instrument to give the electrical resistance values in unit of mΩ-cm$^2$.

FIG. 4 is a photograph and Table 4 presents the properties of the calendered PBT fiber sheet with longitudinal ribs. The sample exhibits very high puncture strength with porosity suitable for application in flooded lead-acid batteries.

TABLE 4

Characteristics of calendered PBT fiber sheet containing 5 wt. % DS-10.

| | |
|---|---|
| Backweb thickness (mm) | 0.337 |
| Overall thickness (mm) | 0.578 |
| Backweb puncture strength (N) | 26 |
| Backweb puncture strength (N/mm) | 76 |
| Density (g/cc) | 0.6 |
| Porosity (%) | 52 |
| Boiled electrical resistance (mΩ-cm$^2$) | 130 |

EXAMPLE 3

Polyethylene terephthalate (PET 7000 pre-dried, Indorama Corporation) resin was fed to a 27 mm co-rotating twin screw extruder (ENTEK Manufacturing LLC) at a rate of 4 lb/hr (1.8 kg/hr). The extrudate having a melt temperature of 266° C. was fed to an Exxon-style melt blown die via a melt pump. The melt blown the was 6 inches (15.24 cm) wide and constructed with 120 orifices aligned in one row at the die tip. The diameter of each of the orifices was 0.010 inch (0.254 mm), The air gap on the die was set at 0.080 inch (2 mm). Heated process air at 310° C. and a 75 SCFM flow rate attenuated the polymer melt exiting the orifices into a stream of fibers. The fibers were deposited on a perforated collector belt to form a fiber sheet of approximately 1.8 mm thickness. The fiber sheet was then calendered to a 1.5 mm thickness using a two-roll calender, the smooth rolls of which had a surface temperature of 95° C. Two 2-inch×3-inch (50-mm×75-mm) coupons were cut from the calendered polymer fiber sheet for dip coating in surfactant solutions. After calendering, the bulk density of the calendered sheet was about 0.14 g/cc.

Two solutions were prepared for dip coating of the calendered polymer fiber sheet coupons above. In one solution, 3.2 g sodium dihexyl sulfosuccinate solution, 80% solids (an anionic surfactant) (MA-80I, Cytec Industries Inc.) was dissolved in 100 cc de-ionized water so that the final solution contained 2.5 wt. % sodium dihexyl sulfosuccinate. In the other solution, 2.0 g PEG-400 di-2-ethylhexanoate (TegMeR® 809, Hallstar Company) was dissolved in 100 cc isopropyl alcohol so that the final solution contained 2.5 wt. % PEG-400 di-2-ethylhexanoate.

One of the 2-inch×3-inch (50-mm×75-mm) coupons prepared above was dip coated in the MA-80I surfactant solution, and the other coupon was dip coated in the TegMeR® 809 solution. The dip-coated samples were dried in a convection oven at 70° C. for 30 minutes. The coated coupons were then evaluated for wettability after repeated washing in de-ionized water, followed by drying. The procedure was described in Example 1. As shown in Table 5, the polymer fiber sheet sample treated with the MA-90I anionic surfactant was initially wettable. However, after the first washing in water, the sample became not wettable as the active ingredient in MA-80I (sodium dihexylsulfosuccinate) was extracted out into water. It is believed that dihexyl sulfosuccinate anions of the MA-80I surfactant do not interact or undergo very weak interaction with PET molecules, but have much stronger interaction with water molecules. When the MA-80I surfactant-coated PET fiber sheet sample was placed in water, the dihexyl sulfosuccinate anions tend to dissociate themselves from the polymer matrix to associate with the water molecules because this interaction is more favorable thermodynamically. The absence of the dihexyl sulfosuccinate anions in the PET fiber sheet sample after washing in water and drying made it not wettable. On the other hand, the polymer fiber sheet sample treated with the TegMeR® 809 remained instantaneously wettable even after washing four times in water. This is so because PEG-400 di-2-ethylhexanoate molecules interact strongly with and are thus "anchored" to the PET molecules, whereas such interaction with water molecules is very weak. Therefore, when the TegMeR® 809 coated fiber sheet sample was placed in water, the bond between the PEG-400 di-2-ethylhexanoate molecules and the PET molecules is still thermodynamically stable. As the result, the PEG-400 di-2-ethylhexanoate molecules remained in the PET fiber sheet after repeated washing and drying, rendering the polymer fiber sheet permanently wettable.

FIG. 5 shows that water "beads up" on the surface of the MA-80I coated polymer fiber sheet after one washing cycle. However, the TegMeR® 809 coated fiber sheet remains instantly wettable, even after washing four times in water.

sheer of approximately 1.8 mm thickness. In subsequent experiments, PET 7000 was replaced with PET 7200 and PET 7800 (Indorama Corporation) while keeping the concentration of TegMeR® 809 the same at 5 wt. %. The intrinsic viscosity of the three PET resin grades is shown in Table 6, and the process parameters for the experiments are shown in Table 7.

TABLE 5

Wetting behavior of PET polymer fiber sheets treated with MA-80I surfactant and TegMeR ® 809 surface modifying agent.

| Resin | Surfactant/Surface Modifying Agent | Wettability by water | | | | |
|---|---|---|---|---|---|---|
| | | Initial | After 1st wash | After 2nd wash | After 3rd wash | After 4th wash |
| PET 7000 | MA-80I | Instantaneously wettable | Not wettable | Not tested | Not tested | Not tested |
| PET 7000 | TegMeR ® 809 | Instantaneously wettable | Instantaneously wettable | Instantaneously wettable | Instantaneously wettable | Instantaneously wettable |

While this coating experiment demonstrates that the TegMeR® 809 can be anchored to PET fibers and function as a surface modifying agent, it is more desirable to incorporate TegMeR® 809 into the extrusion process to form an instantaneously wettable fiber sheet that does not require any secondary processing.

EXAMPLE 4

Polyethylene terephthalate (PET 7000 pre-dried, Indorama Corporation) resin was fed to a 27 mm co-rotating twin screw extruder (ENTEK Manufacturing LLC) at a rate of 4 lb/hr (1.8 kg/hr), PEG-400 di-2-ethylhexanoate (TegMeR® 809, Hallstar Company) was added to the PET resin at the feed zone of the extruder via a medium flow variable speed peristaltic tubing pump (Control Company). The concentration of TegMeR® 809 in the extrudate was examined at both 0 wt. % and 5 wt. %. The extrudate having a melt temperature of 274° C. was fed to an Exxon-style melt blown die via a melt pump. The melt blown die was 6 inches (15.24 cm) wide and constructed with 120 orifices aligned in one row at the die tip. The diameter of each of the orifices was 0.010 inch (0.254 mm). The air gap in the die was set at 0.080 inch (2 mm). Heated process air attenuated the polymer melt exiting the orifices into a stream of fibers. The fibers were deposited on a collector belt to form a fiber

TABLE 6

PET resins with different intrinsic viscosity used to prepare the melt blown fiber sheets.

| PET Resin | PET 7000 | PET 7200 | PET 7800 |
|---|---|---|---|
| Intrinsic viscosity (dL/g) | 0.53 | 0.68 | 0.89 |

TABLE 7

Process conditions used to produce melt blown polymer fiber sheets in Example 4.

| Run ID | MBF140129.01 | MBF131213.03 | MBF131216.01 | MBF140106.03 |
|---|---|---|---|---|
| Orifice diameter (in) | 0.010 | 0.010 | 0.010 | 0.010 |
| Air gap (in) | 0.080 | 0.080 | 0.080 | 0.080 |
| Set back (in) | 0.080 | 0.080 | 0.080 | 0.080 |
| Resin | PET 7000 | PET 7000 | PET 7200 | PET 7800 |
| Fiber Modifying Agent | None | 5 wt. % Tegmer 809 | 5 wt. % Tegmer 809 | 5 wt. % Tegmer 809 |
| Polymer feed rate (lb/hr) | 4 | 4 | 4 | 4 |
| Melt temperature (° C.) | 266 | 261 | 262 | 275 |
| Melt pressure (bars) | 40 | 13 | 19 | 29 |
| Air temperature (° C.) | 310 | 268 | 268 | 315 |
| Air flowrate (SCFM) | 75 | 75 | 75 | 75 |
| Die-to-collector distance (mm) | 335 | 420 | 400 | 470 |

In this example, the TegMeR® 809 fiber modifying agent serves both as a plasticizer and a surface modifying agent.

To obtain small diameter fiber, a polymer resin needs to exhibit low extrudate melt viscosity and melt pressure at the desired processing temperature. As shown in Tables 6 and 7, even though PET 7000 has the lowest intrinsic viscosity, its melt pressure is still quite high—40 bars—when used by itself (sample MBF140129.01). The extrudate melt pressure is expected to be even higher when higher intrinsic viscosity grades are used (neat PET 7200 and PET 7800). With the addition of 5 wt. % TegMeR® 809 to the same PET 7000 resin, the melt pressure is cut by more than one-half to 13 bars at slightly higher extrudate throughput and lower melt temperature, as can be seen on sample MBF131213.03. This implies that the TegMeR® 809 fiber modifying agent is a very effective plasticizer for PET. As expected, the melt pressure progressively increases in the sequence of PET 7000, PET 7200, and PET 7800 resins while keeping the plasticizer concentration the same. This is so because PET 7200 and PET 7800 have higher intrinsic viscosities.

Lowering the extrudate melt pressure enables the achievement of small fiber size, as evident from FIG. 6. The fiber size was measured from scanning electron micrographs taken at 1250× magnification. The number of measurements taken on each fiber sample varied between 13 and 25. The data suggest that adding 5 wt. % TegMeR® 809 to PET 7000 resin reduces the average fiber diameter to 4.9 μm as compared to 7.1 μm for the neat PET 7000 sample. Because of the high intrinsic viscosity for PET 7200 and PET 7800, 5 wt. % loading of TegMeR® 809 was insufficient to reduce their melt pressure to be near the value that was obtained with the PET 7000+5 wt. % TegMeR® 809 formula, resulting in larger fiber size. Nevertheless, their fiber diameter is still smaller than that of the neat PET 7000 sample. Differences in the fiber size of the four melt blown samples can also be confirmed based on the scanning electron micrographs presented in FIG. 7.

The fiber sheet samples were then calendered to a 1.5 mm thickness using a two-roll calender, the smooth rolls of which had a surface temperature of 94° C. for the sample containing no TegMeR® 809 and 84° C. for the samples containing TegMeR® 809. The calendered polymer fiber sheet were used in the following characterization.

EXAMPLE 5

Polyethylene terephthalate (PET 7000 pre-dried, Indorama Corporation) resin was fed to a 27 mm co-rotating twin screw extruder (ENTEK Manufacturing Inc.) at a rate of 4 lb/hr (1.8 kg/hr). PEG-400 di-2-ethylhexanoate (TegMeR® 809, Hallstar Company) was added to the PET resin at the feed zone of the extruder via a medium flow variable speed peristaltic tubing pump (Control Company). The concentration of TegMeR® 809 in the extrudate was varied at 3 wt. %, 5 wt. %, and 8 wt. %. In another experiment, sodium dodecylbenzene sulfonate (Solvay-Rhodacal DS-10) was added to the PET resin at the feed zone of the extruder via a loss-in-weight feeder. The concentration of DS-10 in the extrudate was 5 wt. %. The extrudate, comprised of PET and TegMeR® 809 or DS-10, was fed to an Exxon-style melt blown die via a melt pump. The melt blown die was 6 inches (15.24 cm) wide and constructed with 120 orifices aligned in one row at the die tip. The diameter of each of the orifices was 0.010 inch (0.254 mm). Heated process air attenuated the polymer melt exiting the orifices into a stream of fibers. The fibers were deposited on a fiber collector belt to form a fiber sheet of approximately 1.8 mm thickness. Table 8 summarizes the process conditions used to produce the various polymer fiber sheets.

TABLE 8

Process conditions used to produce melt blown polymer fiber sheets in Example 5.

| Run ID | MBF131206.1 | MBF131213.1 | MBF131213.4 | MBF131213.6 |
|---|---|---|---|---|
| Orifice diameter (in) | 0.010 | 0.010 | 0.010 | 0.010 |
| Air gap (in) | 0.080 | 0.080 | 0.080 | 0.080 |
| Set back (in) | 0.080 | 0.080 | 0.080 | 0.080 |
| Resin | PET 7000 pre-dried | PET 7000 pre-dried | PET 7000 pre-dried | PET 7000 pre-dried |
| Fiber Modifying Agent | 5 wt. % DS-10 | 8 wt. % Tegmer 809 | 5 wt. % Tegmer 809 | 3 wt. % Tegmer 809 |
| Melt temperature (° C.) | 274 | 262 | 262 | 262 |
| Melt pressure (bars) | 12 | 11 | 11 | 18 |
| Air temperature (° C.) | 295 | 267 | 296 | 298 |
| Air flow rate (SCFM) | 35 | 75 | 75 | 75 |
| Die-to-collector distance (mm) | 250 | 525 | 420 | 370 |

The wicking performance of the polymer fiber sheets was evaluated by immersing sample strips (19 mm wide×200 mm long) in sulfuric acid solution (specific gravity=1.28) at room temperature. The wicking height of sulfuric acid for each sample was measured after two minutes. Room temperature-soaked electrical resistance was measured without boiling the samples in water. The electrical measurement method was described in Example 2. The test method for recovery after compression was described in Example 1.

FIGS. 8, 9, 10, and 11 summarize the porosity, two-minute wicking height, room temperature-soaked electrical resistance, and compression recovery of the polymer fiber sheets produced with different PET resins. Because the neat PET 7000 sample was not wettable in water, this sample was not included in the characterization. The electrical resistance and sheet thickness data in FIG. 10 suggest that samples produced with higher intrinsic viscosity PET tend to be more resistive to ionic current flow.

The fiber sheet was then calendered to a 1.5 mm thickness using a two-roll calender, the smooth rolls of which had a surface temperature was at 84° C. The calendered polymer fiber sheets were subsequently characterized as shown below.

In this example, the TegMeR®809 fiber modifying agent serves as both the plasticizer and surface modifying agent, whereas the DS-10 fiber modifying agent functions only as a surface modifying agent.

Samples of the melt blown fiber mats produced with TegMeR® 809 and DS-10 were cut into 2-inch×3-inch (50-mm×75-mm) coupons and evaluated for their sustained wettability. The test procedure was described in Example 1. The results, shown in Table 9, suggest that TegMeR® 809 and DS-10 remain anchored to the PET fibers after repeated washing and drying cycles, thereby imparting sustained wettability to the fiber sheets.

TABLE 9

Wetting performance of the polymer fiber sheets after several water washing and drying cycles.

| Fiber Mat ID | Resin | Fiber Modifying Agent | Wettability by water | | | |
|---|---|---|---|---|---|---|
| | | | As made | After 1st wash | After 2nd wash | After 3rd wash |
| MBF131206.01 | PET 7000 | 5 wt. % DS-10 | Instantaneously wettable | Instantaneously wettable | Instantaneously wettable | Instantaneously wettable |
| MBF131213.01 | PET 7000 | 8 wt. % Tegmer 809 | Instantaneously wettable | Instantaneously wettable | Instantaneously wettable | Instantaneously wettable |
| MBF131213.04 | PET 7000 | 5 wt. % Tegmer 809 | Instantaneously wettable | Instantaneously wettable | Instantaneously wettable | Instantaneously wettable |
| MBF131213.06 | PET 7000 | 3 wt. % Tegmer 809 | Instantaneously wettable | Instantaneously wettable | Instantaneously wettable | Instantaneously wettable |

FIG. 12 presents the scanning electron micrographs of the four fiber sheets produced with DS-10 and TegMeR® 809. The fiber size distributions of the four samples are shown in Table 10. The diameter of the fibers from the four samples ranges between about 0.6 μm to about 7 μm. The DS-10 sample appears to have smaller average fiber size, but its fiber size distribution is broader than that of the TegMeR® 809 samples, as can also be seen from the scanning electron micrographs of FIG. 12.

TABLE 10

Fiber size distribution for the fiber sheets produced with DS-10 and TegMeR ® 809.

| Run ID | MBF131206.1 | MBF131213.1 | MBF131213.4 | MBF131213.6 |
|---|---|---|---|---|
| $25^{th}$ percentile (μm) | 1.0 | 3.6 | 2.1 | 5.0 |
| $50^{th}$ percentile (μm) | 2.0 | 4.1 | 3.6 | 5.4 |
| $75^{th}$ percentile (μm) | 3.2 | 5.0 | 4.3 | 6.1 |
| Average (μm) | 2.5 | 4.4 | 3.5 | 5.5 |
| N | 19 | 17 | 19 | 14 |

The fiber sheet porosity was determined as follows:

% porosity=$[1-(\rho_{bulk}/\rho_{skeletal})] \times 100$, where $\rho_{bulk}$ was measured based on the mass and dimensions of the sample, and $\rho_{skeletal}$ for the sample was measured using He Pycnometry.
The results are shown in FIG. 13. Porosity in the range of 86% to 88% was obtained.
Table 11 provides pore size data for the PET fiber sheets containing DS-10 and TegMeR® 809. The pore size data were determined using capillary flow porometry technique in which Galwick (Porous Materials, Inc.) with a surface tension of 15.9 dynes/cm was used as the wetting liquid. Wet-up/dry-up scans over a pressure range of 0-15 psi were used in this test. The PET fiber sheet with DS-10 had a significantly higher mean flow pore diameter as compared to that of PET fiber sheets made with TegMeR® 809.

TABLE 11

Pore size distribution of the PET fiber sheets with DS-10 and TegMeR ® 809.

| Roll ID | Polymer | Fiber Modifying Agent | Largest Pore (μm) | Mean Flow Pore (μm) | Smallest Pore (μm) |
|---|---|---|---|---|---|
| MBF131206.01 | PET 7000 | 5 wt. % DS-10 | 76.1 | 21.5 | 2.2 |
| MBF131213.01 | PET 7000 | 8 wt. % Tegmer 809 | 33.6 | 9.4 | 1.0 |
| MBF131213.04 | PET 7000 | 5 wt. % Tegmer 809 | 23.7 | 6.8 | 1.4 |
| MBF131213.06 | PET 7000 | 3 wt. % Tegmer 809 | 28.3 | 8.2 | 1.7 |

FIG. 14 summaries the two-minute wicking performance of the polymer fiber sheets. An absorptive glass mat (AGM) sample (BGO 12565J battery grade, 1.5 mm nominal thickness, Hollingsworth & Vose Company (H&V)) was also included in the test for reference. The test procedure was outlined in Example 4. The two-minute wicking height performance of the TegMeR® 809 samples is comparable to that of the reference H&V AGM. The two-minute wicking height of the DS-10 sample is much lower because of its larger pore size.

FIG. 15 shows the room temperature soaked electrical resistance of the four fiber sheet samples. The test procedure was outlined in Example 4 above. The excellent wettability and the high porosity of the melt blown fiber sheet samples lead to very low electrical resistance. Among the samples with TegMeR® 809, the sample with 3% TegMeR® 809—MBF131213.06—appears to have the lowest electrical resistance.

FIG. 16 compares the compression behavior in both dry and wet conditions of a PET fiber sheet against an H&V absorptive glass mat (AGM). The compression test was performed on an Instron universal tester, at a crosshead speed of 1 mm/min. During the test, the thickness of a fiber sheet sample was recorded as the applied compressive stress on the sample was increased. For each type of fiber sheet, two samples, 3.218 mm in diameter and of the same thickness when measured at 10 KPa, were punched out with a steel arch punch. One of the samples was tested in its dry state. The other sample was tested in its wet state after being soaked in de-ionized water for 1 minute. It is evident from FIG. 16 that, under the same compressive stress, the AGM sample in its dry state is thicker than it is in the wet state. This difference in thickness results from shrinkage caused by capillary force that is produced in the AGM wetted with water. On the other hand, the thickness of the PET sample remains relatively unchanged when it is wetted in water under the same compressive stress. For VRLA batteries but with AGM, the AGM becomes thinner as the batteries are filled with sulfuric acid. Consequently, the plate-group pressure in such batteries is reduced from their initial values, resulting in poorer battery performance. This problem is, however, eliminated when the PET fiber sheet is substituted for the AGM. The minimal change in the thickness of the PET fiber sheet in its dry and wet states ensures that the plate-group pressure in the batteries is maintained after sulfuric acid filling. FIG. 16 also indicates that, as the compressive stress is increased, the thickness of the PET fiber sheet decreases at a much slower rate than that of the AGM. This characteristic would translate into better restraint against plate growth in VRLA batteries manufactured with the polymer fiber sheet, as they are cycled between charge and discharge.

FIG. 17 (dry condition) and FIG. 18 (wet condition) show the recovery after compression of the PET fiber sheets. The test method was previously described in Example 1. The polymer fiber sheets show similar or better compression/recovery performance as compared to that of the absorptive glass mat.

EXAMPLE 6

Polyethylene terephthalate (PET 7000 pre-dried, Indorama Corporation) was fed to a 27 mm co-rotating twin screw extruder (ENTEK Manufacturing LLC) at a rate of 4 lb/hr (1.8 kg/hr). PEG-400 di-2-ethylhexanoate (TegMeR® 809, Hallstar Company) was added to the PET resin at the feed zone of the extruder via a medium flow variable speed peristaltic tubing pump (Control Company). The concentration of TegMeR® 809 in the extrudate was 8 wt. %. In this example, the TegMeR® 809 fiber modifying agent functions both as a plasticizer and a surface modifying agent.

The extrudate having a melt temperature of 274° C. was fed to an Exxon-style melt blown die via a melt pump. The melt-blown die was 6 inches (15.24 cm) wide and constructed with 120 orifices aligned in one row at the die tip. The diameter of each of the orifices was 0.010 inch (0.254 mm). The air gap in the die was set at 0.080 inch (2 mm). Heated process air at 310° C. and a 75 SCFM flow rate attenuated the polymer melt exiting the orifices into a stream of fibers that passed through a nip between two rolls that were counter-rotated. The top nip roll had grooves that were regularly spaced with a desired pattern and run along the circumference of the roll. The bottom nip roll was a smooth roll. The heated attenuating air and fiber stream provided heat to the nip rolls. Pressure was applied to the rolls such that the collected fibers at the nip were compressed and ribs with the desired pattern were imparted on the resultant fiber sheet. The gap at the nip was adjusted to give the fiber sheer different backweb thicknesses (the thickness of the thin regions of the ribbed fiber sheet). Table 12 shows the processing conditions and physical characteristics obtained for calendered polymer fiber sheets with ribs prepared with different degrees of compression at the nip rolls.

TABLE 12

Ribbed melt blown polymer fiber sheet separators prepared with different level of compression at the nip rolls.

| Run ID | MBF140204.01 | MBF140204.02 | MBF140204.03 |
| --- | --- | --- | --- |
| Polymer feed rate (lb/hr) | 4 | 4 | 4 |
| Melt temperature (° C.) | 274 | 274 | 274 |
| Melt pressure (bars) | 12 | 12 | 12 |
| Air temperature (° C.) | 310 | 310 | 310 |
| Air flow rate (SCFM) | 75 | 75 | 75 |
| Die-to-collector distance (mm) | 310 | 310 | 450 |
| Gap in the nip (In) | 0.007 | 0.005 | 0.007 |
| Backweb thickness (mm) | 0.225 | 0.193 | 0.231 |
| Overall thickness (mm) | 0.326 | 0.308 | 0.359 |
| Backweb puncture strength (N) | 8 | 7 | 7 |
| Backweb puncture strength (N/mm) | 33 | 33 | 26 |
| Density (g/cc) | 0.56 | 0.70 | 0.51 |
| Porosity (%) | 57 | 46 | 61 |

The test method for backweb puncture strength was outlined in Example 2. Density and porosity of the ribbed fiber sheet samples were determined using the Archimedes' principle. A steel arch punch, 22 mm in diameter, was used to punch out sample disks. First, dry weight of each sample disk was recorded. The samples were next wetted in de-ionized water under continuous vacuum for 5 minutes. Thereafter, the mass was recorded for each sample as it was suspended in water and in air. The density and porosity of the samples were derived from the three weights above.

Table 12 reveals that the backweb and overall thicknesses of the ribbed polymer fiber sheets can be made similar to the backweb and overall thicknesses of the silica-filled polyethylene separator used in flooded lead-acid batteries. The puncture resistance of the ribbed polymer fiber sheets is also very comparable to that of a traditional silica-filled polyethylene battery separator. In addition, the excellent wettability performance gives the ribbed fiber sheets high water accessible porosity, as high as 61%. Furthermore, the porosity of ribbed fiber sheet prepared in this manner can be conveniently controlled by adjusting the gap in the nip or the throughput of the extrudate.

FIG. 19 shows the electrical resistance of the ribbed fiber sheets in sulfuric acid (specific gravity=1.28). The test method was described in Examples 2 and 4. First, the samples were soaked in sulfuric acid at room temperature for 20 minutes, followed by electrical resistance measurement. Then, the samples were thoroughly washed in de-ionized water, followed by boiling in water for 10 minutes. This was done to evaluate how well pores within the fiber sheets were "wetted out" in sulfuric acid the first time when they were soaked at room temperature. The boiled samples were then soaked in sulfuric acid (specific gravity=1.28) for 20 minutes before the electrical resistance measurement was performed. FIG. 19 indicates that the differences in the room temperature soaked electrical resistance and the boiled electrical resistance for the samples are not statistically significant. The observed differences in the measured values come from noise associated with the measurement. Even though the sample MBF140204.02 has the lowest backweb thickness among the three samples, it was compressed the most in the nip when it was prepared. As the result, its porosity was the lowest, leading to the highest electrical resistance. The sample MBF140204.03 has the highest porosity, resulting in the lowest electrical resistance, about 60 mohm-cm$^2$.

FIG. 20 shows pore size distributions for the three ribbed polymer fiber sheets as measured by mercury intrusion porosimetry. The measurements were carried out on an AutoPore IV 9520 Automatic Mercury Porosimeter (Micromeritics). Almost all of the pores in the ribbed fiber sheet samples are in the range of 2 μm to 20 μm in diameter. FIG. 20 also indicates that, for the same extrudate throughput, as the sample was compressed more in the nip, the backweb thickness decreased, and the pore size distribution became smaller.

FIG. 21 shows a comparison of pore size distribution of a calendered flat fiber sheet against pore size distribution of a calendered ribbed fiber sheet. The flat polymer fiber sheet MBF131213.04 (produced in the Example 5 above) contains pores between 10 μm to 100 μm. On the other hand, the ribbed fiber sheet, which underwent more intense calendering, shows much smaller pore volume with smaller pore size distribution. FIG. 22 presents scanning electron micrographs of the two samples, which clearly show the shift toward smaller diameter pores.

EXAMPLE 7

A standard lead-acid battery separator (RhinoHide®, 162×1.3×0.25, SiO$_2$/PE=2.6, ENTEK International LLC) was coated with a thin layer of an acrylic adhesive (Hycar® 261402, Lubrizol) on the major ribs of the separator and dried. A RhinoHide® separator is a silca-filled ultra high molecular weight polyethylene separator. The RhinoHide® separator was fed through a nip between two counter-rotating nip rolls such that the flat side of the separator was touching the bottom roll, and the rib side was touching the top roll.

Polyethylene terephthalate (PET 7000 pre-dried, Indorama Corporation) was fed to a 27 mm co-rotating twin screw extruder (ENTEK Manufacturing LLC) at a rate of 2.1 lb/hr (0.95 kg/hr). A di-ester of polyethylene glycol and hexanoic acid (TegMeR® 812, Hallstar Company) was added to the PET resin at the feed zone of the extruder via a medium flow variable speed peristaltic tubing pump (Control Company). The concentration of TegMeR® 812 in the extrudate was 5 wt. %. In this example, the TegMeR® 812 fiber modifying agent functions both as a plasticizer and a surface modifying agent.

The extrudate having a melt temperature of 271° C. was fed to an Exxon-style melt blown die via a melt pump. The melt blown die was 6 inches (15.24 cm) wide and constructed with 120 orifices aligned in one row at the die tip. The diameter of each of the orifices was 0.010 inch (0.254 mm). The air gap in the die was set at 0.080 inch (2 mm). Heated process air at 300° C. and a 50 SCFM flow rate attenuated the polymer melt exiting the orifices into a stream of fibers. The fibers were deposited on the rib side of the RhinoHide® separator at the nip of the two nip rolls.

The gap in the nip was adjusted so that the PET fiber sheet was dens ed to a desired porosity and, at the same time, conformed to the rib pattern of the separator. The pressure in the nip and the heat from the attenuating air facilitated a good bond between the PET fiber sheet and the ribs of the RhinoHide® separator, thus forming an integrated RhinoHide®-PET fiber sheet composite.

FIG. 23 presents optical micrographs showing the interfaces between two sub-major ribs for (a) a traditional RhinoHide® separator-glass fiber mat laminate and the (b) RhinoHide® separator-PET fiber sheet composite. The traditional RhinoHide® separator-glass fiber mat laminate was produced by bonding a glass fiber sheet (B5A type, 0.53 mm thick, 73 g/m$^2$, Owens Corning) to glued major ribs of a RhinoHide® separator, which this case was the same type as the separator used to produce the RhinoHide®-PET fiber sheet composite above. In the case of the RhinoHide® separator-glass fiber mat laminate, there is an unoccupied space defined between the two sub-major ribs, the RhinoHide® separator, and the glass fiber mat. On the other hand, this unoccupied space is minimal or eliminated for the RhinoHide®-PET fiber sheet composite because the PET fiber sheet conforms very well to the shape of the RhinoHide® separator. Such characteristic of the RhinoHide®-PET fiber sheet composite is believed to mitigate acid stratification in flooded lead-acid batteries.

FIG. 24 shows a scanning electron micrograph image of the PET fiber sheet from the RhinoHide®-PET fiber sheet composite. The image was taken on the surface that was in contact with the RhinoHide® separator.

FIG. 25 shows the water accessible porosity of the RhinoHide®-PET fiber sheet composite, as well as porosities of the RhinoHide® separator and the PET fiber sheet components. The water accessible porosity was determined using the Archimedes' principle. For the RhinoHide®-PET fiber sheet composite, a 5-inch (12.7-cm) long sample was boiled in de-ionized water for 10 minutes, then exchanged for de-ionized water at room temperature. Sample disks were punched out from the wetted composite using a 22 mm diameter steel arch punch. The masses of each sample disk suspended in water and in air were recorded. The disks were thereafter dried in a convective oven at 110° C. for 10 minutes. After cooling to room temperature, the mass of each of the dried sample disks was measured. The porosity of each sample was derived from the mass measured as described above. The RhinoHide® separator and the PET fiber sheet were carefully separated from each other before determining their water accessible porosity using the same test procedure.

FIG. 26 shows boiled electrical resistance of the RhinoHide®-PET fiber sheet composite, the RhinoHide® component of the composite, and the traditional RhinoHide® separator-glass fiber sheet laminate. The test method for boiled electrical resistance measurement was outlined in Example 6. The RhinoHide®-PET fiber sheet composite exhibits higher electrical resistance than that of the single RhinoHide® separator because of the added PET fiber sheet layer. However, its electrical resistance is similar to that of the traditional RhinoHide® separator-glass fiber sheet laminate.

It will be obvious to those having skill in the art that many changes may be made to the details of the above-described embodiments without departing from the underlying principles of the invention. The scope of the present invention should, therefore, be determined only by the following claims.

The invention claimed is:

1. An aqueous wettable battery separator comprising a high porosity polymer fiber sheet that is instantaneously wettable by an aqueous medium, comprising:
a three-dimensional matrix of melt-blown polymer fibers consisting of polyethylene terephthalate (PET) and a single fiber modifying agent functioning as at least one of a plasticizer or a surface modifying agent, the high porosity polymer fiber sheet having a thickness and interconnecting pores that communicate throughout the thickness, the high porosity polymer fiber sheet having greater than 80% porosity and having a compression recovery of 93% or more, the single fiber modifying agent being only homogeneously distributed throughout substantially all of individual fibers of the sheet, the single fiber modifying agent being anchored to the polymer fibers of the matrix thereby to provide instantaneous and sustained wettability to the high porosity polymer fiber sheet, wherein the high porosity polymer fiber sheet is wettable after washing at least four times with water.

2. The aqueous wettable battery separator of claim 1, in which the polymer fibers are formed from a thermoplastic resin having a melt viscosity, the plasticizer reducing the melt viscosity of the thermoplastic resin during polymer fiber formation and the surface modifying agent promoting the instantaneous and sustained wettability of the high porosity polymer fiber sheet.

3. The aqueous wettable battery separator of claim 1, in which the matrix of polymer fibers has a surface, and further comprising a silica-filled polyethylene separator that is bonded to the surface of the matrix of polymer fibers to form a silica-filled separator-polymer fiber sheet composite.

4. The aqueous wettable battery separator of claim 3, in which the silica-filled polyethylene separator has a surface on which spaced-apart ribs are formed and to which the surface of the matrix of polymer fibers conforms.

5. The aqueous wettable battery separator of claim 1, in which the matrix of polymer fibers has a non-planar surface topography on one or more surfaces of the matrix.

6. The aqueous wettable battery separator of claim 5, in which the non-planar surface topography is characterized by an embossed pattern, a calendered pattern, or a densified pattern.

7. The aqueous wettable battery separator of claim 5, in which the non-planar surface topography is characterized by a pattern of extruded spaced-apart ribs.

8. The aqueous wettable battery separator of claim 5, in which the non-planar surface topography is characterized by a pattern deposited on one or more surfaces of the matrix.

9. An aqueous wettable battery separator comprising a high porosity multi-layer composite polymer fiber sheet, comprising:

a first high porosity polymer fiber sheet layer comprising the high porosity polymer fiber sheet of claim 1, wherein the matrix constitutes a first matrix and the single fiber modifying agent constitutes a first fiber modifying agent;
a second high porosity polymer fiber sheet layer including a second three-dimensional matrix of polymer fibers and a second fiber modifying agent, the second matrix having a thickness and interconnecting pores that communicate throughout the thickness of the second matrix, and the second fiber modifying agent anchored to the polymer fibers of the second matrix; and
the first and second fiber modifying agents imparting to the respective first and second polymer fiber sheet layers, and thereby to the multi-layer composite polymer fiber sheet, instantaneous and sustained wettability by an aqueous medium.

10. The aqueous wettable battery separator of claim 9, in which the polymer fibers of the first matrix and the polymer fibers of the second matrix are formed from different polymers.

11. The aqueous wettable battery separator of claim 9, in which the polymer fibers of the first matrix and the polymer fibers of the second matrix are formed from the same polymer of different fiber diameters.

12. A method of making an aqueous wettable battery separator that is instantaneously wettable by an aqueous medium, comprising:
concurrent extrusion of a mixture consisting of polyethylene terephthalate (PET) and a single fiber modifying agent to produce a sheet of polymer fibers in the form of a three-dimensional matrix having a thickness and interconnecting pores that communicate throughout the thickness of the matrix, and in which the polymer fiber sheet has greater than 80% porosity and has a compression recovery of 93% or more, the single fiber modifying agent being only homogeneously distributed throughout substantially all of individual fibers of the sheet, the single fiber modifying agent anchored to the polymer fibers of the matrix to thereby form a polymer fiber sheet that exhibits instantaneous and sustained wettability by an aqueous medium, and the single fiber modifying agent functioning as at least one of a plasticizer or a surface modifying agent, wherein the polymer fiber sheet is wettable after washing at least four times with water.

13. The method of claim 12, further comprising calendaring the polymer fiber sheet to impart to it a desired physical property.

14. The method of claim 12, in which the concurrent extrusion comprises melt blowing, electrospinning, melt fiber spinning, solution spinning, electroblowing, force spinning, or melt spinning by cold air attenuation.

15. An energy storage device comprising the aqueous wettable battery separator of claim 1.

16. The aqueous wettable battery separator of claim 1, in which the thermoplastic polymer has a melting point of 260° C. or higher.

17. An aqueous wettable battery separator comprising a high porosity polymer fiber sheet that is instantaneously wettable by an aqueous medium, comprising:
a three-dimensional matrix of polymer fibers consisting of polyethylene terephthalate (PET) and a single fiber modifying agent functioning as at least one of a plasticizer or a surface modifying agent, the high porosity polymer fiber sheet having a thickness and interconnecting pores that communicate throughout the thickness, the high porosity polymer fiber sheet having greater than 80% porosity, each of the fibers of the sheet exhibiting a diameter of 1.5 µm or greater, wherein the single fiber modifying agent is only homogeneously distributed throughout substantially all of individual fibers of the sheet, the single fiber modifying agent being anchored to the polymer fibers of the matrix thereby to provide instantaneous and sustained wettability to the high porosity polymer fiber sheet, wherein the high porosity polymer fiber sheet is wettable after washing at least four times with water.

18. The aqueous wettable battery separator of claim 17, in which the single fiber modifying agent consists of polyethylene glycol-400 di-2-ethylhexanoate.

19. The aqueous wettable battery separator of claim 1, wherein the single fiber modifying agent consists of polyethylene glycol-400 di-2-ethylhexanoate.

* * * * *